(12) United States Patent
Aiyer

(10) Patent No.: US 7,545,503 B2
(45) Date of Patent: Jun. 9, 2009

(54) SELF REFERENCING HETERODYNE REFLECTOMETER AND METHOD FOR IMPLEMENTING

(75) Inventor: Arun Ananth Aiyer, Lewisville, TX (US)

(73) Assignee: Verity Instruments, Inc., Carrollton, TX (US)

( * ) Notice: Subject to any disclaimer, the term of this patent is extended or adjusted under 35 U.S.C. 154(b) by 0 days.

(21) Appl. No.: 11/237,225

(22) Filed: Sep. 27, 2005

(65) Prior Publication Data

US 2007/0070357 A1 Mar. 29, 2007

(51) Int. Cl.
G01B 11/06 (2006.01)
(52) U.S. Cl. .................................. 356/485; 356/504
(58) Field of Classification Search .............. 356/485, 356/493, 503, 504; 250/559.27
See application file for complete search history.

(56) References Cited

U.S. PATENT DOCUMENTS

| | | | |
|---|---|---|---|
| 4,688,940 A | | 8/1987 | Sommargren |
| 4,762,414 A | * | 8/1988 | Grego ..................... 356/485 |
| 4,912,530 A | * | 3/1990 | Bessho .................... 356/487 |
| 5,450,205 A | | 9/1995 | Sawin et al. |
| 5,548,401 A | | 8/1996 | Ozaki |
| 5,600,441 A | * | 2/1997 | de Groot et al. ............ 356/492 |
| 5,657,124 A | | 8/1997 | Zhang et al. |
| 6,172,752 B1 | | 1/2001 | Haruna |
| 6,215,556 B1 | | 4/2001 | Zhang et al. |
| 6,261,152 B1 | | 7/2001 | Aiyer |

OTHER PUBLICATIONS

Ultrafast Ellipsometric Mapping of Thin Films, NA9402187, IBM Technical Disclosure Bulletin, vol. 37, issue No. 2A, Feb. 1994, pp. 187-188.*

(Continued)

*Primary Examiner*—Samuel A Turner
(74) *Attorney, Agent, or Firm*—Rudolph J. Buchel, Jr.

(57) ABSTRACT

The present invention is directed to a self referencing heterodyne reflectometer system and method for obtaining highly accurate phase shift information from heterodyned optical signals, without the availability of a reference wafer for calibrations. The self referencing heterodyne reflectometer rapidly alternates between a heterodyne reflectometry (HR) mode, in which an HR beam comprised of s- and p-polarized beam components at split angular frequencies of $\omega$ and $\omega+\Delta\omega$ is employed, and a self referencing (SR) mode, in which an SR beam comprised of p-polarized beam components at split angular frequencies of $\omega$ and $\omega+\Delta\omega$ is employed. When the two measurements are made in rapid succession, temperature induced noise in the detector is be assumed to be the same as for both measurements. A measured phase shift $\delta_{Ref/film}$ is generated from the HR beam and a reference phase shift $\delta_{Ref/Sub}$ is generated from the SR beam. The measured phase shift $\delta_{Ref/film}$ generated from the beat signals of the HR beam is used for film thickness measurements. The SR beam is p-polarized and no significant reflection will result from a film surface and will not carry any phase information pertaining to the film. The reference phase shift $\delta_{Ref/Sub}$ generated from the beat signals of the SR beam is equivalent to that obtained using a reference sample. Film phase shift information is then derived from the measured phase shift $\delta_{Ref/film}$ and the reference phase shift $\delta_{Ref/Sub}$ which is independent of phase drift due to temperature. Film thickness is calculated from the film phase shift information.

22 Claims, 17 Drawing Sheets

OTHER PUBLICATIONS

Separation of measurement of the refractive index and the geometrical thickness by use of a wavelength-scanning interferometer with a confocal microscope, Fukano et al, Applied Optics, Jul. 1999, pp. 4065-4073.*

Hongzhi Zhao, et al., in "A Practical Heterodyne Surface Interferometer with Automatic Focusing," SPIE Proceedings, vol. 4231, 2000, p. 301.

* cited by examiner

COMPOSITE $\delta_{Ref/film}$ AND $\delta_{Ref/Sub}$ MEASUREMENTS

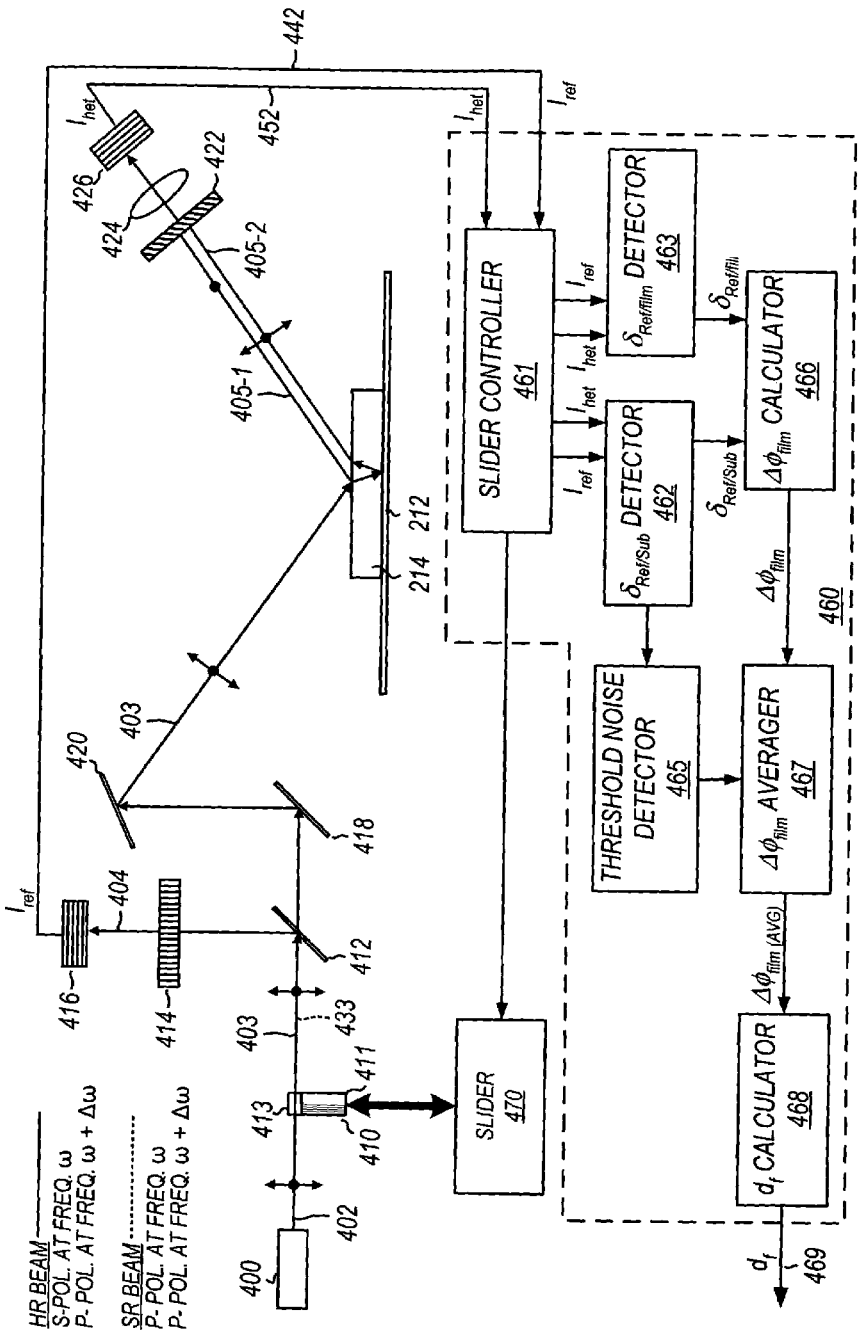

$\delta_{Ref/Sub}$ MEASUREMENT

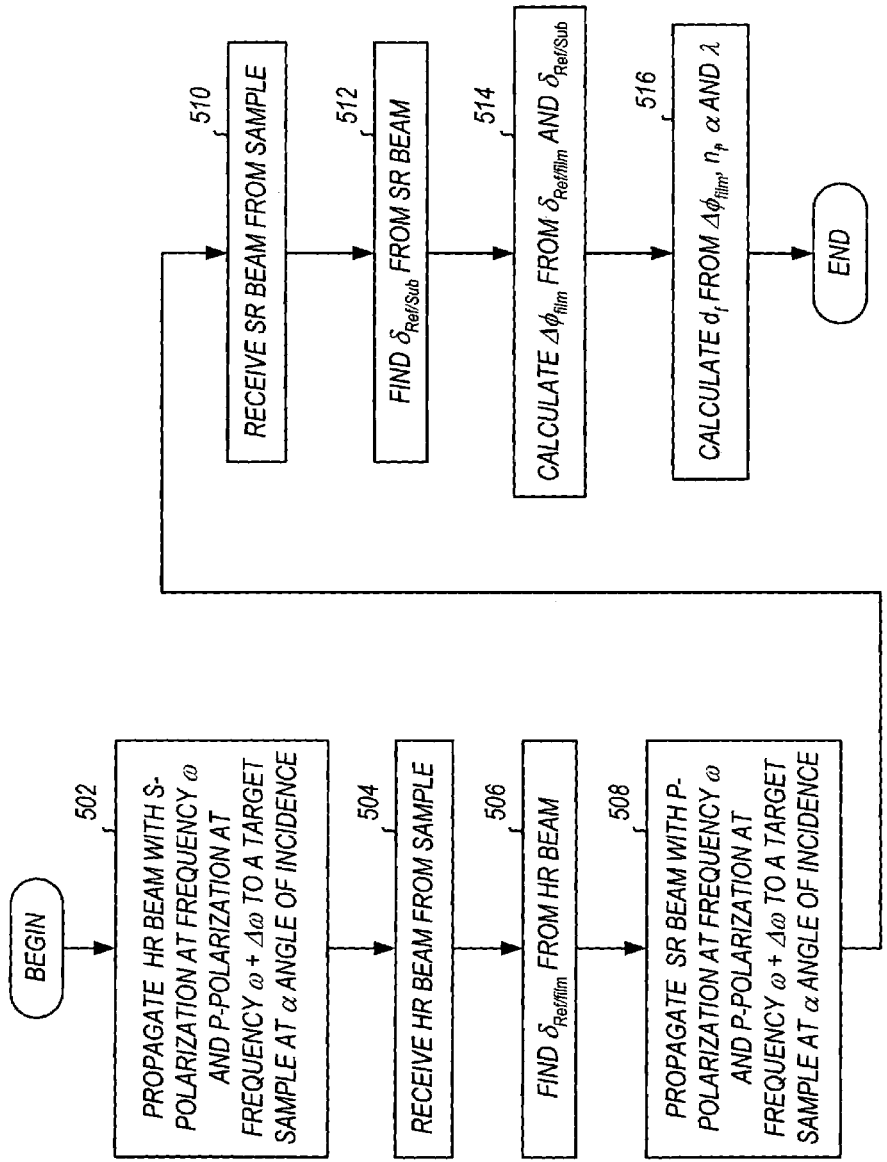

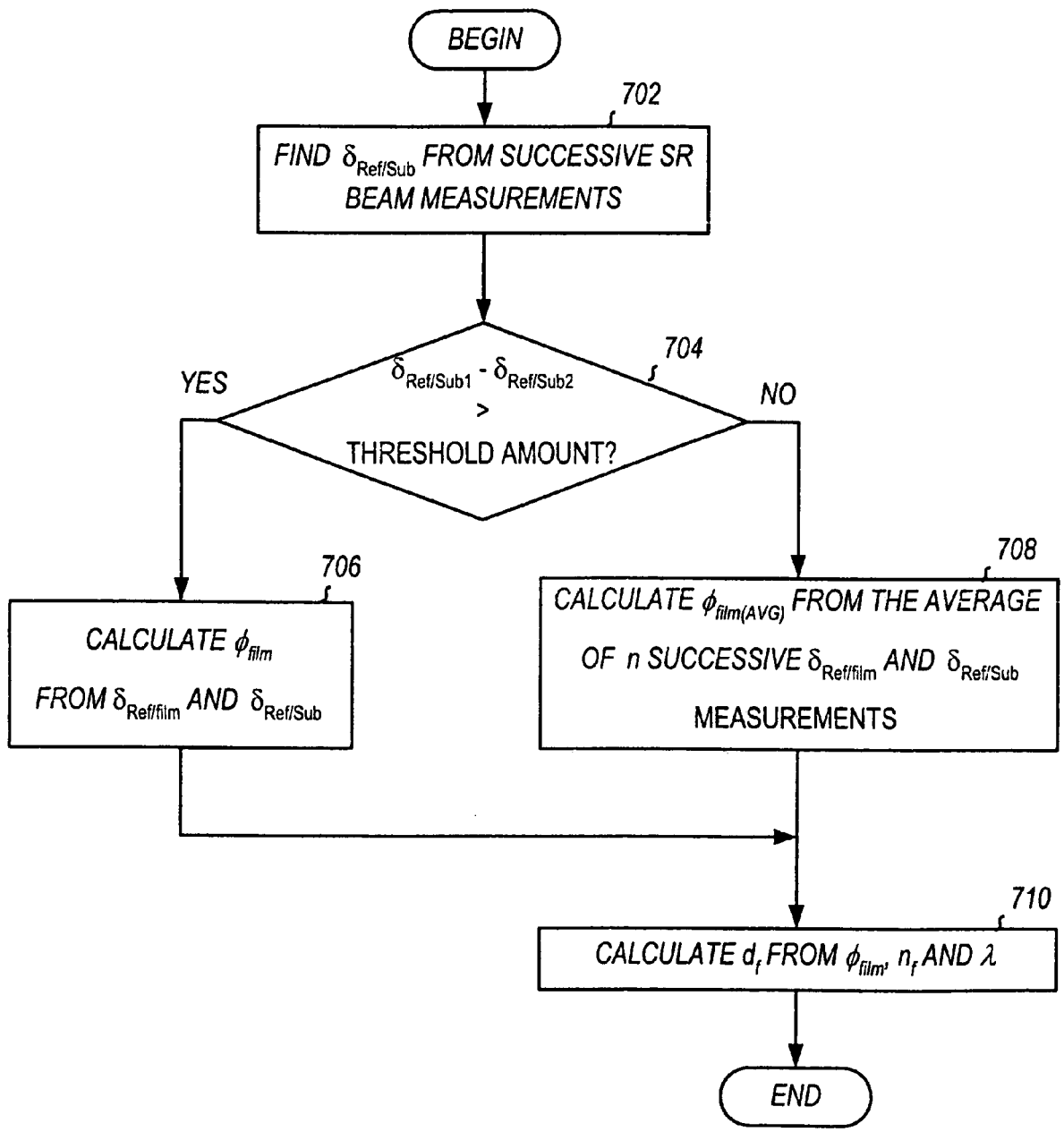

$\delta_{Ref/film}$ MEASUREMENT

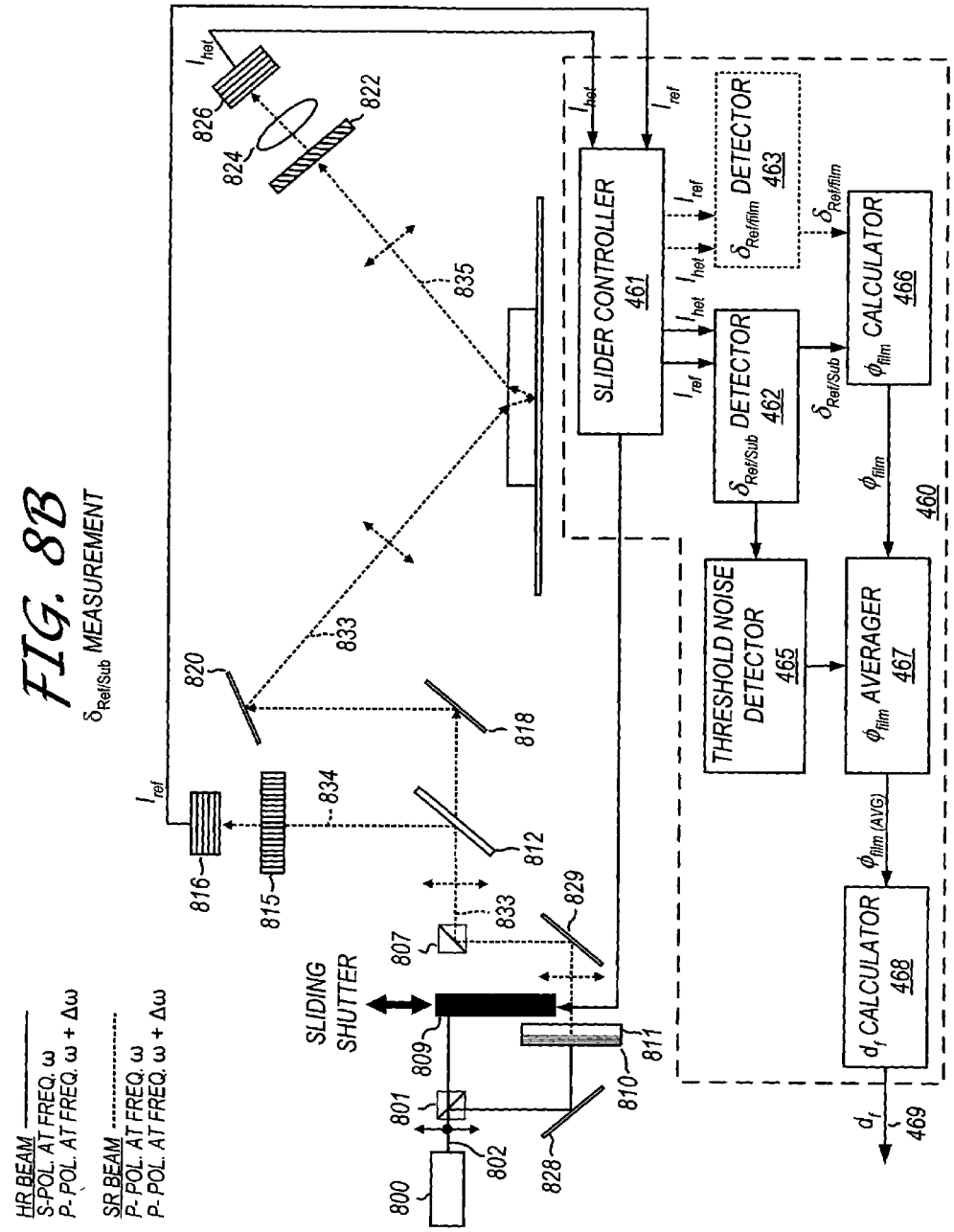

$\delta_{Ref/film}$ MEASUREMENT $\delta_{Ref/Sub}$ MEASUREMENT $\delta_{Ref/film}$ MEASUREMENT $\delta_{Ref/Sub}$ MEASUREMENT

WAFER MEASUREMENT

DETECTOR MEASUREMENT

US 7,545,503 B2

SELF REFERENCING HETERODYNE REFLECTOMETER AND METHOD FOR IMPLEMENTING

CROSS REFERENCES TO RELATED APPLICATIONS

The present application is related to co-pending U.S. patent application Ser. No. 11/178,856 entitled "Method for Monitoring Film Thickness Using Heterodyne Reflectometry and Grating Interferometry," filed Jul. 10, 2005, and co-pending U.S. patent application Ser. No. 11/066,933 entitled "Heterodyne Reflectometer for Film Thickness Monitoring and Method for Implementing," filed Feb. 25, 2005, both assigned to the assignee of the present application. The above identified applications are incorporated by reference herein in their entireties.

BACKGROUND OF THE INVENTION

The present invention relates to reflectometry. More particularly, the present invention relates to a reflectometer system and method for obtaining thickness information by measuring phase shift in reflected split frequency signals via heterodyne interferometry. Furthermore, the present invention relates to a method and system for using the heterodyned signals from a heterodyne reflectometer for measuring the thicknesses of thin and ultra thin films formed over substrates. Still more particularly, the present invention relates to a self referencing heterodyne reflectometer for monitoring of film thickness which compensates for detector drift. Additionally, the present invention relates to a heterodyne reflectometer which compensates for spurious noise generated in the optical measurement components. The present invention also relates to a heterodyne reflectometer for in situ monitoring of film thickness.

Due to the increasing demand for ultra precise tolerances in chip fabrication, the physical characteristics of the subsequent layers must be very carefully controlled during processing to achieve satisfactory results for most applications. Broadly defined, interferometry relates to the measurement of the interaction of waves, such as optical waves. An interferometer works on the principle that two coherent waves that coincide with the same phase will enhance each other while two waves that have opposite phases will cancel each other out. One prior art monitoring system utilizes interferometry for measuring variations in surface profiles, from which feature height information can be inferred. Hongzhi Zhao, et al., in "A Practical Heterodyne Surface Interferometer with Automatic Focusing," SPIE Proceedings, Vol. 4231, 2000, p. 301, which is incorporated herein by reference in its entirety, discloses an interferometer for detecting a phase difference between reference heterodyne signal, and a measurement signal. Height information related to the sharp illumination point on the surface can be inferred from the measurement. Although the reference and measurement signals are generated by beams that are propagated over different paths, this is a common path interferometer. This approach is sometimes referred to as the common-axis approach or the normal-axis approach because the incident and reflected beams occupy a common path or axis to a target location, which is normal to the surface being examined.

One shortcoming of the common-path heterodyne interferometers known in the prior art is that the height information is calculated from an average height of the large illumination area of the reference signal. Thus, the accuracy of the results is adversely affected by surface roughness. Another limitation of the prior art common axis method is that it does not measure or calculate an actual thickness parameter for a film layer.

Other attempts in monitoring film thicknesses achieve heterodyning by frequency modulating the light source. U.S. Pat. No. 5,657,124 to Zhang, entitled "Method of Measuring the Thickness of a Transparent Material," and U.S. Pat. No. 6,215,556 to Zhang, et al., entitled "Process and Device for Measuring the Thickness of a Transparent Material Using a Modulated Frequency Light Source," disclose such devices, and are incorporated herein by reference in their entireties. With regard to these devices, a polarized light beam having a modulated frequency is directed to the target surface and heterodyne interference signals are detected from two rays, one reflected off the top surface of a target and a second from a bottom surface of a target. A thickness is determined from the number of beats per modulation period by comparing the heterodyned interference signals with the linearly modulated intensity of the light source. The principle drawback of these types of devices is that since the heterodyning is achieved by frequency modulating, the source and thinnest film measurable is limited by its bandwidth.

Other heterodyne interferometers obtained a heterodyned signal from two separate beams, a first beam at a first frequency and polarization, and a second beam at a second frequency and polarization. U.S. Pat. No. 6,172,752 to Haruna, et al., entitled "Method and Apparatus for Simultaneously Interferometrically Measuring Optical Characteristics in a Noncontact Manner," and U.S. Pat. No. 6,261,152 to Aiyer, entitled "Heterodyne Thickness Monitoring System," which are incorporated herein by reference in their entireties, disclose this type of interferometer.

FIG. 1 is a diagram of a heterodyne thickness monitoring apparatus in which a pair of split frequency, orthogonally polarized beams are propagated in separate optical paths prior to being mixed and heterodyned, as is generally known in the prior art, for use with a Chemical Mechanical Polishing (CMP) apparatus. Accordingly, heterodyne thickness monitoring system 100 generally comprises a CMP apparatus, a wafer 110 and a measurement optical assembly. Wafer 110 includes substrate 112 and film 114.

The measurement optical assembly generally comprises various components for detecting and measuring a Doppler shift in the optical frequency of the reflected beam, including laser source 140, beam splitter (BS) 144, polarization beam splitter (PBS) 146, beam quarter-wave plate 148, beam reflector 152, beam quarter-wave plate 150, mixing polarizer 143, photodetector 147, mixing polarizer 145, photodetector 149, and signal-processing assembly 154 electrically connected to the outputs of photodetectors 147 and 149.

In operation, laser diode 140 emits a beam having first linear polarized light component 102 at a first wavelength and second linear polarized component 103 at a second wavelength, but orthogonally polarized to the first polarization component. The first and second polarization components 102 and 103 propagate collinearly to BS 144 where a portion of both components are reflected to mixing polarizer 145 as beams 134 and 135 and then to detector 149 as beams 116 and 117, where signal $I_2$ is produced.

The transmitted portions of polarization components 102 and 103 propagate to PBS 146 as beams 104 and 105. At PBS 146 component 104 follows a first transmission path as beam 106 and passes through reference quarter-wave plate 148 to reflector 152 and is reflected back through quarter-wave plate 148 as beam 122 (orthogonally polarized to beam 106), where it reflects at PBS 146 to mixing polarizer 143 and on to detector 147 as beam 124.

The second polarization component, from component 105, follows a separate transmission path, from the first path, as beam 120 and is orthogonally oriented to first polarization component 104 and, therefore, reflects off PBS 146, passes through quarter-wave plate 150 as beam 109 and propagates to optically transparent rotatable carrier 115. Beam 109 experiences partial reflection at the back surface rotatable carrier 115, the interface between substrate 112 and the top surface of film 114, thereby producing partially reflected beams 111S, 111T and 111B, respectively. Each of reflected beams 109S, 109T and 109B propagate back through quarter-wave plate 150, are transmitted through PBS 146 as beams 113S, 113T and 113B and propagate collinearly with beam 122 to mixing polarizer 145 as beams 124, 135S, 135T and 135B and then detected at photodetector 147 as signal $I_1$. Importantly, $I_1$ is produced from both beam 107, which oscillates at one optical frequency and interacts the film, and beam 120, which oscillates at another optical frequency and that propagates in a second optical path that does not interact with the film. Signals $I_1$ and $I_2$ are compared for finding a thickness measurement.

When the measurement beam undergoes an optical path length change, the beat signal will experience corresponding phase shift. The amount of phase shift can be determined by comparing the phase of the measurement beam with the phase of the beam without the optical path length change. The phase shift between the beams can be extrapolated to a distance, from which a thickness may be inferred (or change in thickness) for the target sample.

As might be apparent, because signal $I_1$ is detected from two beams having different optical paths, only one of which interacts with the sample, any change in the optical path of either beam will be inferred as a change in the distance to the surface of the film. Furthermore, because only the distance to a single point on the surface of the film is measured; extraneous factors that interfere with that measurement can be interpreted as a change in thickness, such as wafer tilt. Therefore, this reflectometer is largely relegated to profile measurements.

SUMMARY OF THE INVENTION

The present invention is directed to a self referencing heterodyne reflectometer system and method for obtaining highly accurate phase shift information from heterodyned optical signals, without the availability of a reference wafer for calibrations. The heterodyne reflectometer is generally comprised of an optical light source with split optical frequencies, a pair of optical mixers to generate the optical beat signal, a pair of optical detectors for detecting and converting the optical beat signal to electrical heterodyne beat signals, and a phase shift detector for detecting a phase shift between the two electrical signals.

The self referencing heterodyne reflectometer operates in two modes: a heterodyne reflectometry (HR) mode in which an HR beam comprised of s- and p-polarized beam components at split angular frequencies of $\omega$ and $\omega+\Delta\omega$ is employed; and a self referencing (SR) mode in which an SR beam comprised of p-polarized beam components at split angular frequencies of $\omega$ and $\omega+\Delta\omega$ is employed. A measured phase shift $\delta_{Ref/film}$ is derived from the $I_{ref}$ and $I_{het}$ signals detected from HR beam and a reference phase shift $\delta_{Ref/Sub}$ is derived from the $I_{ref}$ and $I_{het}$ signals detected from SR beam. The measured phase shift $\delta_{Ref/film}$ generated from the beat signals of the HR beam is used for film thickness measurements. The SR beam is p-polarized and no significant reflection will result from a film surface. The reflection returning from the film-substrate interface will not carry any phase information pertaining to the film. Therefore, the reference phase shift $\delta_{Ref/Sub}$ generated from the beat signals of the SR beam is equivalent to that obtained using a reference sample.

By alternating between the HR and SR modes in rapid succession, temperature induced noise and phase drift in the detector can be assumed to be the same as for both measurements. A film phase shift $\Delta\phi_{film}$ can then be calculated from the measured phase shift $\delta_{Ref/film}$ and the reference phase shift $\delta_{Ref/Sub}$. In so doing, the temperature induced detector noise and phase drift on both detectors is effectively canceled out, yielding a temperature independent $\Delta\phi_{film}$.

Since the reference phase shift $\delta_{Ref/Sub}$ is not affected by changes in the film, and the substrate does not change, any variation between successive reference phase shift values is attributable to detector noise or temperature related phase drift. Unacceptable noise levels can be detected by monitoring sequential reference phase shift values for change. The magnitude of phase change between the measurements can then be compared to a noise threshold.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIGS. 4A-4C are diagrams of operating states of a self referencing heterodyne reflectometer for measuring thin film thicknesses without the availability of a reference wafer in accordance with an exemplary embodiment of the present invention;

FIG. 5 is a flowchart depicting the method for finding a film thickness using a self-referencing heterodyne reflectometry in accordance with an exemplary embodiment of the present invention;

FIG. 7 is a flowchart depicting the method for identifying detector noise that may be resistive to the noise canceling in accordance with an exemplary embodiment of the present invention;

FIGS. 8A and 8B are diagrams of a self referencing heterodyne reflectometer configured without moving optical components in accordance with an exemplary embodiment of the present invention;

Other features of the present invention will be apparent from the accompanying drawings and from the following detailed description.

DETAILED DESCRIPTION OF THE INVENTION

In a Michelson heterodyne interferometer, the interfering reference beam and measurement beam have slight optical frequency difference, typically~KHz to MHz. The interference between the two is represented by the equation:

$$I = A + B \cos(\Delta\omega t + \phi) \quad (1)$$

A is a direct current component;
B is the signal component that represents fringe visibility;
$\phi$ is the phase difference between reference beam and measurement beam; and
$\Delta\omega$ is the angular frequency difference between the two signals. The interference between the two can be observed as a beat signal with an angular frequency equal to the difference angular frequency, $\Delta\omega$.

When the measurement beam undergoes an optical path length change ($\Delta d$), the beat signal will experience corresponding phase shift $\Delta\phi = (4\pi \times \Delta d)/\lambda$.

The present inventor has disclosed an uncomplicated heterodyne reflectometer approach to thin film measurements in co-pending U.S. patent application Ser. No. 11/178,856 entitled "Method for Monitoring Film Thickness Using Heterodyne Reflectometry and Grating Interferometry," filed Jul. 10, 2005, and also in co-pending U.S. patent application Ser. No. 11/066,933 entitled "Heterodyne Reflectometer for Film Thickness Monitoring and Method for Implementing," filed Feb. 25, 2005. In accordance with this approach, the measurement signal is heterodyned from two beam components that each interact with the sample. One of the beam components is almost totally refracted into the film and reflected off the bottom of the film and the other is reflected off the surface. Thus, the phase of the heterodyned measurement signal is due to the difference in the optical paths of the two beam components, which, in turn, is related to the thickness of the sample. This concept will be understood with the discussion of the heterodyne reflectometer in FIG. 2.

Figure 1:
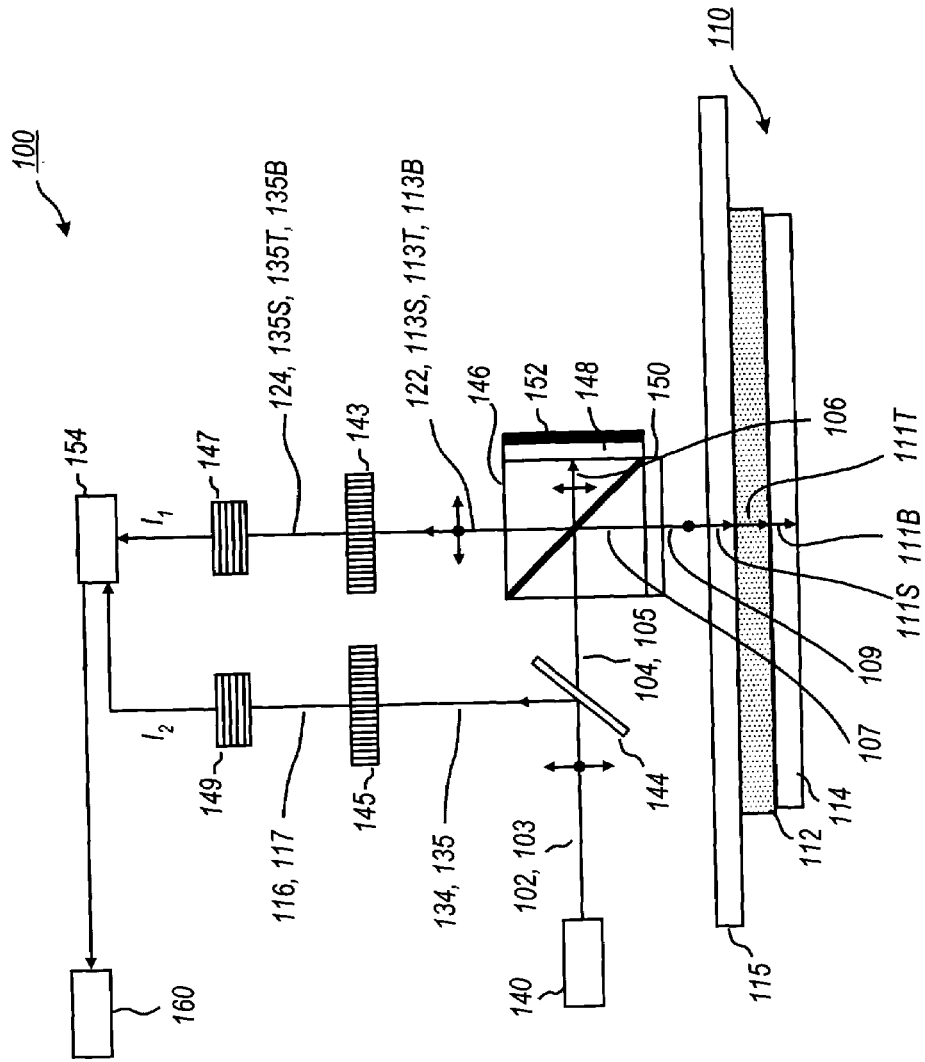
FIG. 1 is a diagram of a heterodyne interferometer as is generally known in the prior art.
Figure 2:
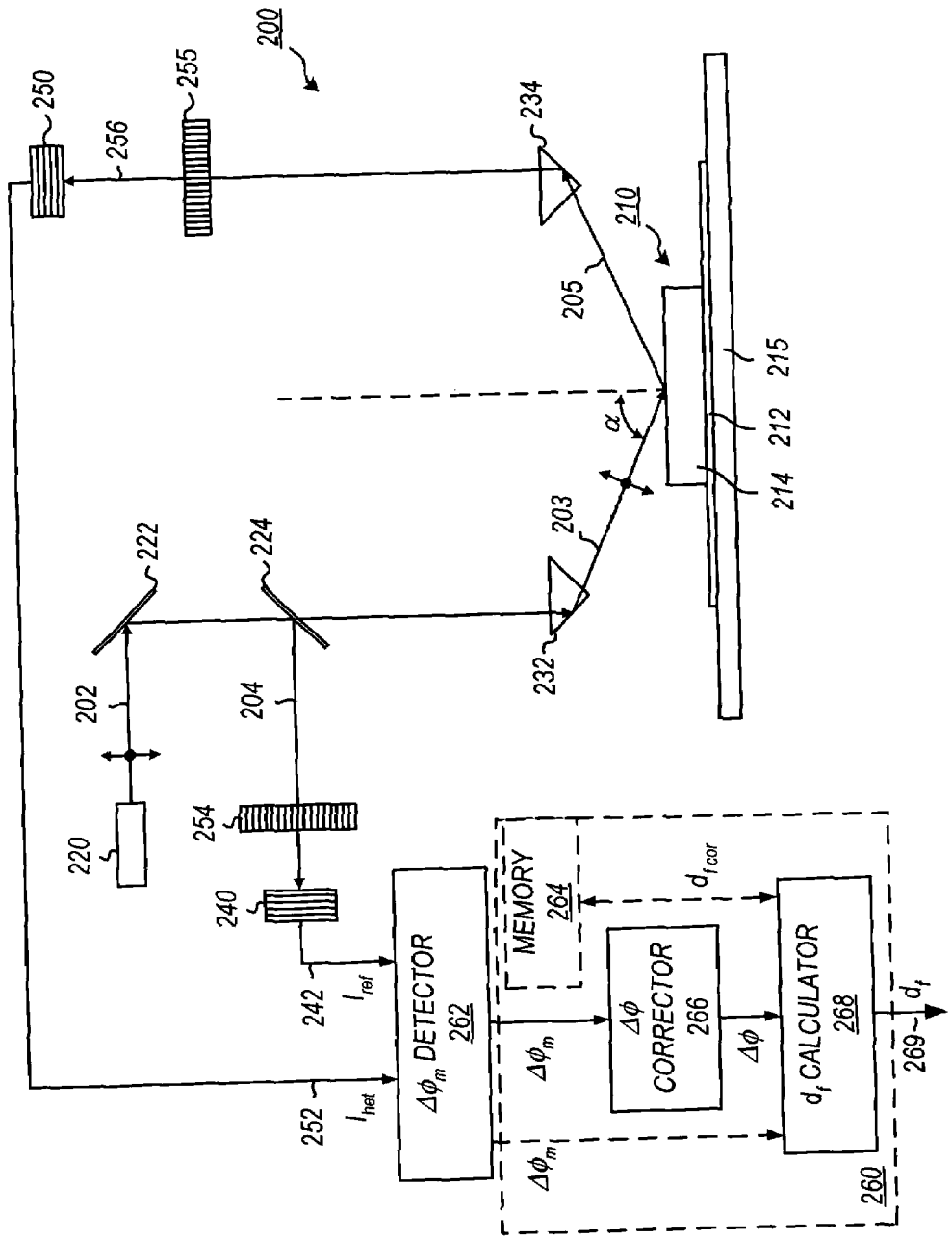
FIG. 2 is a diagram of a heterodyne reflectometer for measuring thin film thicknesses.

FIG. 2 is a diagram of a heterodyne reflectometer for measuring thin film thicknesses. Heterodyne reflectometer 200 generally comprises optics for directed incident beam 203 incident on film 214 and substrate 212 at incidence angle $\alpha$. Light source 220 generates beam 202 having two linearly polarized components, operating at split optical frequencies, that are orthogonal with respect to each other for illuminating the target. For instance, the beam may have an s-polarized beam component at frequency $\omega$ and a p-polarized beam component at frequency $\omega + \Delta\omega$.

Beam 203 comprises two linearly polarized components that are orthogonal to each other, with split optical frequencies, i.e., s- and p-polarized beam components at split frequencies of $\omega$ and $\omega + \Delta\omega$, respectively. As used herein, $\Delta\omega$ is approximately 20 MHz, but is merely exemplary and other frequency splits may be used without departing from the scope of the present invention. Light source 220 for generating this beam may be, for example, a Zeeman split He—Ne laser. Alternatively, the beam from a single mode laser source can be split into two separate beams with one or both of the separate beams being frequency shifted to a predetermined frequency using, for example, an acousto-optic modulator. The split-frequency beams can then be recombined prior to incidence with film 214. The light beam is directed into the plane of incidence, and toward film 214, using any suitable optical component for redirecting the path of the aforementioned light beam. As depicted in the figure, a pair of triangular prisms (incident prism 232 and reflection prism 234) direct incident beam 203 to film 214 and receive reflected beam 205 from film 214, but optionally may be any suitable optical component for directing the light path while retaining the beam's polarization. For example, light source 220 may be directed in the plane of incidence (at incidence angle $\alpha$ from normal), using a mirror or other reflecting optical component, or, alternatively, coupled into polarization preserving fibers which are then positioned to launch the beam at the predetermined incidence angle.

Notice that the paths of both optical frequencies interact with the film along a single path, i.e., the s-polarization component and the p-polarization component of the measurement beam are substantially collinear beams and approximately coaxial. Furthermore, the illuminated areas on film 214 from s-polarization and p-polarization components are approximately coextensive at the target location.

A primary function of a heterodyne reflectometer of the present invention is to determine the actual phase shift, $\Delta\phi$, from a measured phase shift, $\Delta\phi_m$. Measured phase shift $\Delta\phi_m$ is the phase difference between the phase of reference signal $I_{ref}$ and the phase of measurement signal $I_{het}$, i.e., the beat of a signal obtained from a non-reflected path (the reference signal) and the beat signal obtained from a reflected path. The true (or actual) phase shift $\Delta\phi$ is necessary for determining an error-free and accurate thickness of a film layer, $d_f$. Therefore, finding measured phase shift $\Delta\phi_m$ necessitates employing two signal detectors, one for detecting/generating reference signal $I_{ref}$ and a second for detecting/generating the measurement signal $I_{het}$.

Signal detector 240 senses the split beam (reference beam) 204 from mixing polarizer 254, which mixes the s- and p-polarization components of beam 204, prior to reflecting off of film 214, and produces reference signal $I_{ref}$ 242, which is indicative of the phase of beam 204, phase $\phi$. Detector 240 may be, for example, a PIN (Positive-Intrinsic-Negative) detector, or any photo detector that responds to the beat frequency, and produces reference signal $I_{ref}$ with a beat frequency of $|\omega - (\omega + \Delta\omega)|$. Reference signal $I_{ref}$ 242 is transmitted to $\Delta\phi_m$ measured phase shift detector 262, where it is used as the reference phase for determining measured phase shift $\Delta\phi_m$ induced by film 214.

Signal detector 250, on the other hand, senses reflected beam 256 from mixing polarizer 255, which mixes the s- and p-polarization components of beam 205, propagated from prism 234, and after interacting with film 214. Signal detector 250 produces measurement signal $I_{het}$ 252, which is indicative of the phase of beam 256, phase $\phi + \Delta\phi$, and is phase shifted from the phase of reference signal $I_{ref}$ by $\Delta\phi$. Detector 250 may be, as an example, a PIN detector, which monitors the reflected optical beam 256 and produces heterodyne measurement signal $I_{het}$, also with a heterodyne angular frequency of $\Delta\omega$.

Signal 252 is received at $\Delta\phi_m$ measured phase shift detector 262, which compares measured heterodyne measurement signal $I_{het}$ 252 with reference signal $I_{ref}$ 242 and determines measured phase shift $\Delta\phi_m$. Phase shift $\Delta\phi$ is induced by film 214, and the amount of the phase shift depends on several factors, including the thickness of film 214, the refractive index $n_f$ for the particular film being monitored, and in higher phase shifts, a correction factor. The interrelationship between the factors will be discussed in greater specificity further below. In any case, an accurate film thickness $d_f$ can then be determined by processor 260 from corrected phase shift $\Delta\phi$, which is obtained from measured phase shift $\Delta\phi_m$. However, since measured phase shift $\Delta\phi_m$ has an inherent error, at least at higher phase shifts, accurate thickness measurements are possible only after the measured phase shift is corrected.

Data processed system 260 may take a variety of forms depending on the particular application. Often data from inline wafer processing is processed in real time on a computer or PC that is electrically coupled to reflectometer detectors 240 and 250 or $\Delta\phi_m$ measured phase shift detector 262. However, the reflectometer systems may be pre-configured with internal data processors and/or discrete firmware components for storing and processing monitored data in real time. Also, the raw measured data from the reflectometer may be handled by a data processing system resident on the wafer process equipment. In that case, the wafer processing firmware performs all data processing for the reflectometer, including thickness computations. Accordingly, heterodyne reflectometer system 200 is depicted with generic data processing system 260, which may include discrete firmware and hardware components. These components generally include measured phase shift corrector 266 and thickness calculator 268. Optionally, system 260 may include error correction data memory 264, the operation of which will be discussed below.

More particularly, $\Delta\phi_m$ phase shift detector 262 receives reference signal $I_{ref}$ 242 and heterodyne measurement signal $I_{het}$ 252 from the respective detectors and measures phase shift $\Delta\phi_m$ between the two. Phase shift detector 262 may use any appropriate mechanism for detecting corresponding points on reference signal $I_{ref}$ and measurement signal $I_{het}$ for phase detection.

Although not depicted in the figure, phase shift detector 262 may also be equipped with an I/O interface for entering wavelength and/or oscillator frequency information for facilitating signal detection.

Once measured phase shift $\Delta\phi_m$ has been detected, it is passed to $\Delta\phi_m$ measured phase shift corrector 266 for error correction. The error in measured phase shift $\Delta\phi_m$ may be appreciable at higher phase shifts, but the error can be corrected by applying a polynomial function to $\Delta\phi_m$, with an appropriate set of correction coefficients. Furthermore, $\Delta\phi_m$ corrector 266 requires certain parametric data for performing the error correction computations. These data include the source wavelength, $\lambda$, the top film layer refractive index, $n_f$, and the incidence angle, $\alpha$ $\alpha$ will be typically set at a default, $\alpha=60°$, rather than precisely at the Brewster's angle for the source wavelength and film refractive index $n_f$, the reasons for which are discussed in U.S. patent application Ser. No. 11/178,856 "Method for Monitoring Film Thickness Using Heterodyne Reflectometry and Grating Interferometry," and also in co-pending U.S. patent application Ser. No. 11/066,933 entitled "Heterodyne Ref lectometer for Film Thickness Monitoring and Method for Implementing."

Finally, $d_f$ thickness calculator 268 receives the corrected phase shift, $\Delta\phi$, from $\Delta\phi_m$ corrector 266 and computes a corrected film thickness $d_f$ for the film being examined, i.e., film 214. Alternatively, $d_f$ thickness calculator 268 may receive measured phase shift $\Delta\phi_m$ directly from $\Delta\phi_m$ phase shift detector 262 and then algebraically correct the measured thickness with film thickness correction data it fetches from memory 264. The thickness error correction data, or a look-up table (LUT), are loaded into memory 264 beforehand based on the refractive index $n_f$ for film 214.

Still another option is to store a table of corrected thickness values, $d_f$, in memory 264 which are indexed to discrete measured phase shift values. In that case, on receiving $\Delta\phi_m$ from phase shift detector 262, $d_f$ thickness calculator 268 retrieves a corrected thickness value from memory 264 and outputs the value.

This method relies on the anisotropic reflection of the radiation from the top surface of the film. Therefore, the heterodyne reflectometer set-up is optimally configured with incidence angle $\alpha$ near Brewster's angle. The maximum sensitivity to phase shift for a film is achieved at the Brewster's angle for the refractive index of a particular film under examination. At the Brewster's angle, the amount of reflected p-polarized light from the top surface of the film is nil or minimal. Thus, signal, $I_{het}$, 252 from detector 250 is rich with film-thickness information.

However, as a practical matter, the optical components in a monitoring system may be semi-permanently configured for cooperating with a particular processing apparatus (e.g., at a preset 60° angle of incidence, $\alpha=60°$). In those systems, adjusting the incidence to a precise angle may be difficult or impossible. Nevertheless, as will be shown in the following discussions, one benefit of the presently described invention is that the thickness measurements are highly accurate over a wide range of angles around the Brewster's angle for a particular film's refractive index.

Furthermore, in addition to the anisotropic reflection from the film surface, reflective anisotropy may also be present in the film itself and the bottom film surface or the substrate. It has been assumed that the film material and the lower interface are isotropic for the s- and p-polarizations. However, this assumption may not always be correct for every film type, see T. Yasuda, et al., "Optical Anisotropy of Singular and Vicinal Si—SiO$_2$ Interfaces and H-Terminated Si Surfaces," J. Vac. Sci. Technol. A 12(4), July/August 1994, p. 1152 and D. E. Aspnes, "Above-Bandgap Optical Anisotropies in Cubic Semiconductors: A Visible-Near Ultraviolet Probe of Surfaces," J. Vac. Sci. Technol. B 3(5), September/October 1985, p. 1498. Accordingly, in those situations where the top film and/or the substrate exhibit significant reflectance anisotropy, the optimized incidence angle can be between normal incidence and Brewster incidence.

The heterodyne reflectometer set-up incidence angle $\alpha$ for configuring system 200 is related to, and could change with, the refractive index, $n_f$, of the film under inspection and the wavelength, $\lambda$, of the illumination source. Since different films have different refractive indexes, the angle $\alpha$ could be adjusted corresponding to changes in the index. If this is desired, a means should be provided for adjusting the incident angle of heterodyne reflectometer system 200 based on the refractive index of the various films to be examined. This may be accomplished by enabling table system 210 and/or prisms 232 and 234 to move. For example, mirrors 232 and 234 may be configured with two degrees of movement, one in a rotational direction about an axis that is perpendicular to the plane of incidence formed by beams 203 and 205, and the normal of film 214, and a translation movement direction that is parallel to the surface normal. Alternatively, mirrors 232 and 234 may have one degree of rotational movement about a direction perpendicular to the plane of incidence and table assembly 210 will then have one degree of translational movement in the normal direction. The latter exemplary embodiment is depicted herein with mirrors 232 and 234 and table assembly 210 (depicted herein as table 215, film 214 and substrate 212) shown with phantom lines indicting movement. The phantom components show incident beam 203 and receiving reflected beam 205 redirected to a different incident angle α, in response to a change in the value of refractive index $n_f$. However, as emphasized above and below, using a default incidence angle, α=60°, is advantageous over setting the incidence angle precisely at the Brewster's angle for the film and light source.

Figure 3A:
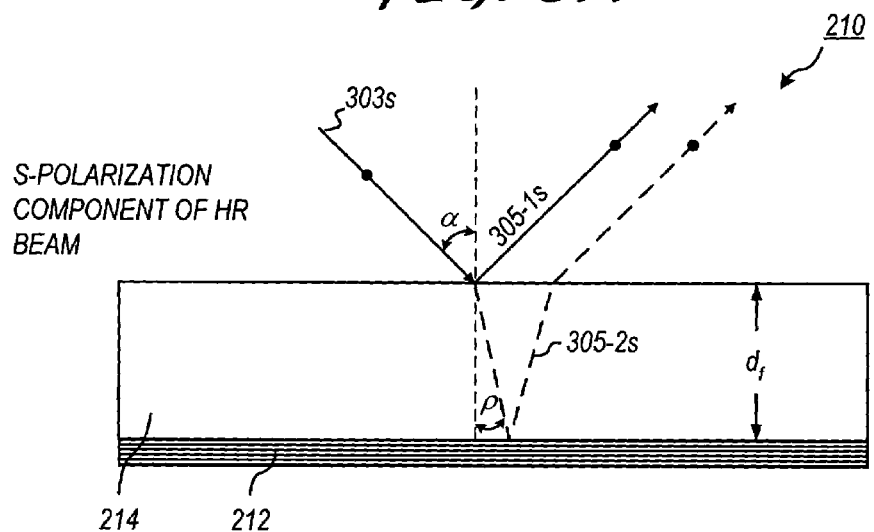
FIGS. 3A and 3B are diagrams showing the interaction of a linearly polarized incident beam, comprised of s- polarization component having an optical angular frequency of $\omega$, and a p-polarization component having a split optical angular frequency of $\omega+\Delta\omega$, with a thin film.
Figure 3B:
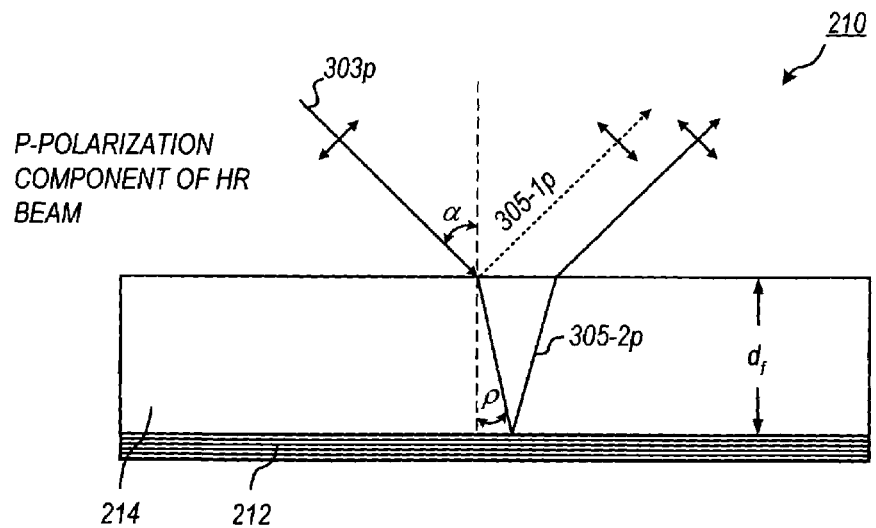

Turning to FIGS. 3A and 3B, the source of phase shift Δϕ attributable to film 214 is depicted. The s-polarization component of the HR beam is depicted as being separated (FIG. 3A) from the p-polarization component of the HR beam (FIG. 3B) for clarity. Turning to the s-polarization component of the HR beam is depicted in FIG. 3A, incident beam 303 is comprised of s-polarization component 303s (having an optical angular frequency of ω) and p-polarization component 303p (having an optical angular frequency of ω+Δω), which are orthogonal to each other. Both component 303s and component 303p are incident to the normal of film 214 at angle α. At the surface of film 214, a portion of beam component 303s is reflected as reflected ray 305-1s, while another portion of beam component 303s refracts into film 314 at a refraction angle, ρ, then reflects off substrate 212 and refracts out of film 214 as refracted ray 305-2s. Turning to the p-polarization component of the HR beam as depicted in FIG. 3B, incident beam component 303p is split into a reflected ray 305-1p and refracted ray 305-2p.

Basic to calculating accurate film thicknesses is optimizing the light interaction with the film to be more sensitive to film thickness, which in turn enhances the heterodyne phase shift, $\Delta\phi_m$. The aim is to increase the phase shift of the heterodyned signal as much as possible from the reference signal, i.e., increase $\Delta\phi_m$. This is done by optimizing the incidence angle. Since the reflected beam is composed of s- and p-component rays that are both reflected and refracted, it is advantageous for one polarization component to have a greater portion of reflected rays from the film surface than the other. Because s- and p-polarized light with split frequencies is used for the measurement, it is possible to adjust the incident angle, α, to achieve this result. As is well understood in the art, linear polarized light will exhibit this result by setting the incident angle to the Brewster's angle for the source wavelength. At Brewster's angle, virtually the entire p-polarization component of incident beam 303p is refracted into the film as 305-2p with very little, if any, reflected as ray 305-1p. Conversely, operating at Brewster's angle, the s-polarization component of incident beam 303s, sees significant reflection as ray 305-1s with the rest penetrating the film as refracted ray 305-2s. Therefore, angle α may be adjusted such that more of one polarized light component is not reflected, but almost totally refracted in the film. Hence, after the rays are mixed, the resulting beam is sensitized for phase shift due to a disproportionate contribution of the s-polarization component reflected from the film's surface. Therefore, it can be appreciated that a phase shift results from the time necessary for refracted components to travel over the increased path distance, $$\Delta d = 2d_f \sqrt{n_f^2 - \sin^2\alpha},$$

where $$\delta_f = \frac{2\pi}{\lambda} \sqrt{n_f^2 - \sin^2\alpha} \times d_f$$

δ is the phase shift attributable to the film thickness;
α is the angle of incidence;
n is the refractive index of the film; and
d is the film thickness.

With the heterodyne reflectometer configured toward being more sensitive to thickness, a calculation for determining thickness from phase shift Δϕ can be established. In the classical heterodyne interferometer, the phase shift is measured and a corresponding change in the beam path difference, Δd, can be calculated using the following expression:

$$\Delta\phi = 4\pi \times \Delta d/\lambda \tag{2}$$

Δϕ is the phase shift of the measured signal, $I_{het}$,
Δd is the corresponding beam path difference; and
λ is wavelength of the heterodyne illumination source.
Thus:

$$\Delta d = \Delta\phi\lambda/4\pi \tag{3}$$

In heterodyne reflectometry, since Δϕ=2δ, and $$\delta = \frac{2\pi}{\lambda} \sqrt{n^2 - \sin^2\alpha} \times d,$$

the thickness of the film can then be found by the following equation:

$$d = \left( \frac{\Delta\phi \times \lambda}{4\pi \times \sqrt{n^2 - \sin^2\alpha}} \right) \tag{4}$$

The proofs of Equations (2)-(4) can be found in U.S. patent application Ser. Nos. 11/066,933 and 11/178,856 discussed above.

Heterodyne reflectometry by nature is a differential measurement technique. In accordance with the prior art, phase shift corresponding to a film is measured with respect to a reference substrate that has a film of known thickness. Ideally, the operator has access to the reference sample in order to take a reference measurement each time before measuring the product/monitor wafer. In the absence of that, one would require the heterodyne reflectometry sensor to be robust enough not to have (systematic) phase drift before the next reference sample measurement is made. Highly precise measurements (~0.001 deg.), are influenced by a drift in the heterodyne frequency, phase shift induced by optical components, presence of surface contaminants, and detector response to temperature change. Some obstacles can be overcome. Because of the common mode nature of heterodyne reflectometry, long-term frequency drift will not influence measurement. Optical component induced phase shift can be eliminated by using appropriate coatings and angles of incidence. Taking data in a controlled environment will prevent surface contaminants from influencing measurement. Studies done with heterodyne reflectometry detectors have shown that phase drift as much as 0.01 deg/° C. can occur in a heterodyne reflectometry system if the detector temperature is not controlled.

Therefore, in accordance with one aspect of the present invention, a self referencing heterodyne reflectometer and method for implementing is disclosed. In accordance with another aspect of the present invention, a heterodyne reflectometer and method for implementing is disclosed which does not rely on the availability of reference wafer sample for accuracy. These aspects of the present invention, as well as other aspects, will be better understood through a discussion of FIGS. 4A-4C below.

Figure 4A:
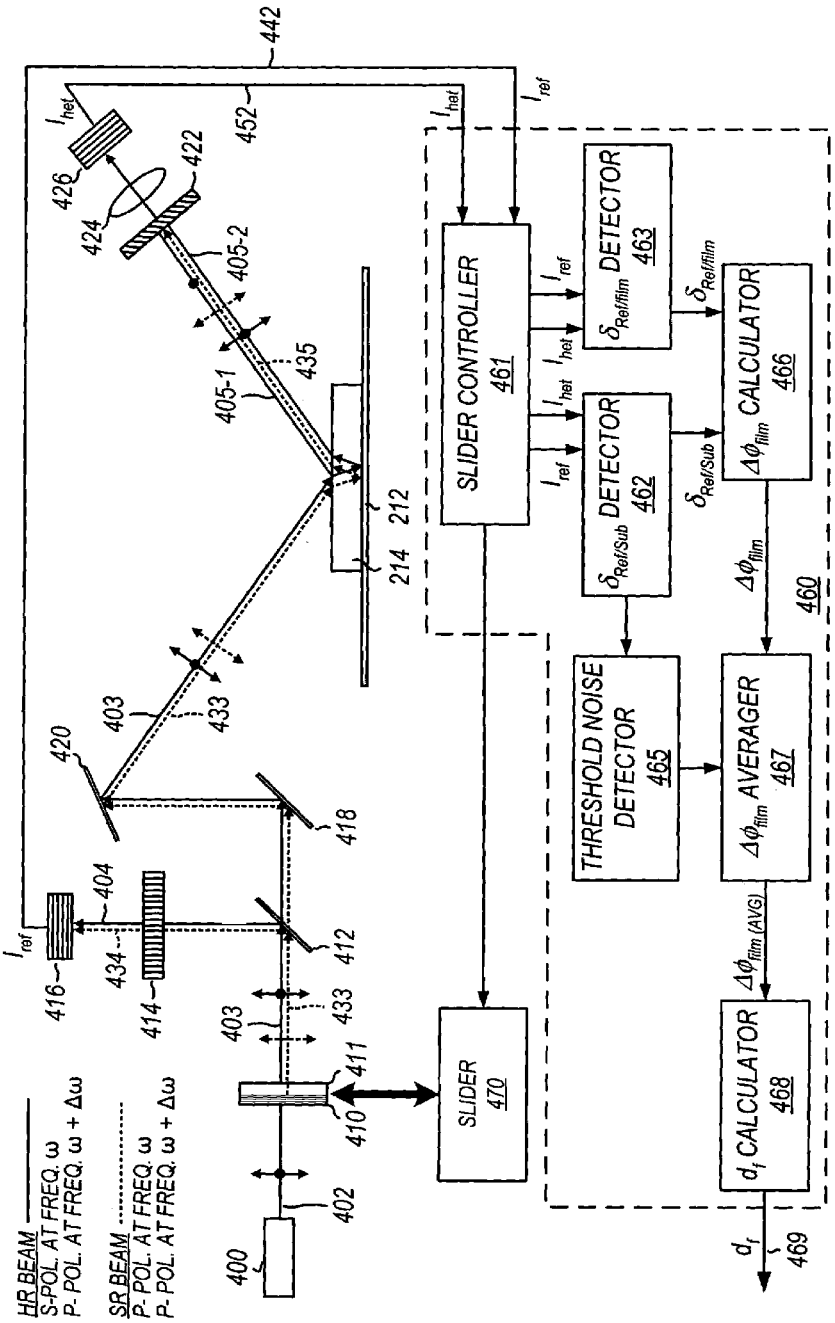
Figure 4C:
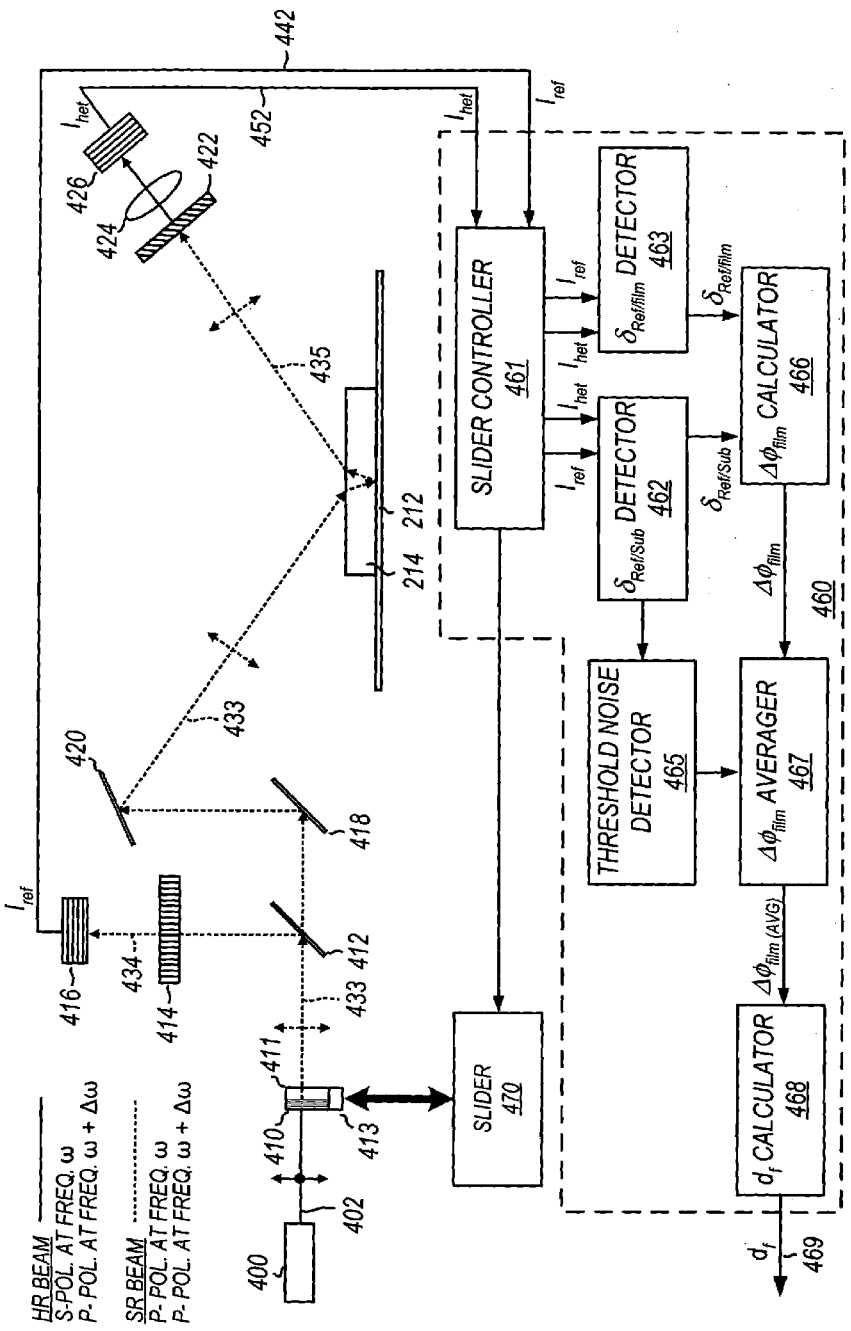

FIGS. 4A-4C are diagrams of a self referencing heterodyne reflectometer for measuring thin film thicknesses without the availability of a reference wafer in accordance with an exemplary embodiment of the present invention. FIG. 4A depicts a self referencing heterodyne reflectometer showing a composite operational state for obtaining $\delta_{Ref/film}$ phase measurements and $\delta_{Ref/Sub}$ reference phase measurements. FIG. 4B shows the operational state for obtaining $\delta_{Ref/film}$ measurements and FIG. 4C shows the operational state for obtaining $\delta_{Ref/Sub}$ measurements.

Similar to heterodyne reflectometer 200 discussed in FIG. 2, the self referencing heterodyne reflectometer of the present invention generally comprises optics for directing a beam incident to film 214 and substrate 212 at incidence angle α. Light source 400 generates two collinear beams (beam 402) having two linearly polarized components, operating at split optical angular frequencies, that are orthogonal with respect to each other for illuminating the target; an s-polarized beam component at frequency ω and a p-polarized beam component at frequency ω+Δω. This beam will be referred to hereinafter as a HR (heterodyne reflectometer) beam. As used herein, Δω is approximately 20 MHz, but is merely exemplary and other frequency splits may be used without departing from the scope of the present invention. Light source 400 for generating this beam may be, for example, a Zeeman split He—Ne laser. Alternatively, the beam from a single mode laser source can be split into two separate beams with one or both of the separate beams being frequency shifted to a predetermined frequency, using for example, an acousto-optic modulator. The split-frequency beams can then be recombined prior to incidence with film 214. The light beam is directed into the plane of incidence, and toward film 214, using any suitable optical component for redirecting the path of the aforementioned light beam.

HR beam 402 propagates as HR beam 403 and split by BS (beam splitter) 412 into reflected HR beam 404, through polarizer 414 (@45°) where a reference signal, $I_{ref}$, is detected by detector 416. Reference signal $I_{ref}$ provides phase information for the beam before the beam interacts with the sample. The portion of beam 403 transmitted through BS 412 propagates off of reflective optical components 418 and 420 (mirrors or the like) and incident on film 214 and substrate 212 (typically a wafer). As discussed above, the angle of incidence, α, (not shown) is typically set near the Brewster angle for the source wavelength, λ, of light source 400 and the film's refractive index $n_f$, the reasons for which are discussed in U.S. patent application Ser. Nos. 11/066,933 and 11/178,856 (or at a default, e.g., α=60°, rather than precisely at the Brewster angle).

HR beam 403 interacts with film 214 and substrate 212 resulting in reflected beam components 405-1 and 405-2, which pass through polarizer 422 (@45°) where a heterodyne measurement signal, $I_{het}$, is detected by detector 426 for the HR beam. As mentioned above, because this method relies on the anisotropic reflection of the radiation from the top surface of film 214, beam component 405-1 is almost exclusively s-polarization reflected from the surface of film 214, while beam component 405-2 results from interactions below the surface of film 214. Therefore, beam component 405-2 comprises virtually the entire p-polarization component from the incident beam, in addition to some s-polarization component. Film thickness information can be obtained from heterodyne measurement signal $I_{het}$ and reference signal $I_{ref}$ as discussed above with respect to FIG. 2.

When polarizer 410 and λ/2 plate 411 combination (referred to hereinafter as polarizer/λ/2 combination 410/411 or component 410/411) is introduced into the path of beam 402, p-polarized heterodyne beam 433 results which is a composite beam made up of both ω and ω+Δω frequencies. This beam will be referred to hereinafter as a SR (self-referencing) beam.

SR beam 433 is split by BS (beam splitter) 412 into reflected SR beam 434, through polarizer 414 (@45°) where reference signal $I_{ref}$ is detected by detector 416 for the SR beam. The portion of beam 433 transmitted through BS 412 propagates off of reflective optical components 418 and 420 and incident on film 214 and substrate 212 following the same path as incident HR beam 403. Incident interacts with film 214 and substrate 212 resulting in reflected beam 435, which pass through polarizer 422 (@45°) where heterodyne measurement signal $I_{het}$ is detected by detector 426 for the SR beam.

When the SR beam is incident on a dielectric film, there is no or insignificant reflection (~$10^{-3}$) from the dielectric film surface. The reflection returning from the film-substrate interface will not carry any phase information pertaining to the film. Therefore, the beat signals generated by the SR beams can be used to obtain a reference phase value, which is equivalent to that obtained using a reference sample. Thus, because incident SR beam 433 is p-polarized, virtually none is reflected from the surface of film 214, but instead interacts with, and is reflected from the interface between film 214 and substrates 212. Both the ω and ω+Δω frequency components of the reflected p-polarized SR beam are reflected as an SR beam, beam 435. Consequently, measurement signal $I_{het}$ detected by detector 426 from SR beam 435 provides a reference phase value that is not affected by changes in film thickness.

FIG. 4A depicts a composite operational state for generating SR and HR beams, but as a practical matter the SR and HR beams are propagated sequentially, with $\delta_{ref/Sub}$ and $\delta_{ref/film}$ also generated sequentially. FIG. 4B shows the operational state for of the self referencing heterodyne reflectometer in the HR beam generation mode for detecting measurement phase $\delta_{ref/film}$. In accordance with this exemplary embodiment of the present invention, polarizer/λ/2 combination 410/411, rather than being stationary, is a sliding optical component further including aperture 413. Sliding polarizer/λ/2/aperture combination 410/411/413 provides a mechanism for rapidly alternating between an HR beam and an SR beam. In HR beam mode, sliding polarizer/λ/2/aperture combination 410/411/413 is positioned such that aperture 413 aligns in the path of beam 402, thereby allowing the HR beam generated by light source 400 to pass. Conversely, in SR beam mode, sliding polarizer/λ/2 aperture combination 410/411/413 is positioned such that polarizer/λ/2 combination 410/411 align in the path of beam 402, thereby converting HR beam 402 into SR beam 433. The movement force necessary is provided by slider actuator 470, which is controlled by slider controller 461.

Continuing, in the HR beam generation mode, slider controller 461 instructs slider actuator 470 to move in the HR beam position with aperture 413 aligned directly in the path of beam 402. Incident HR beam 403 propagates to detectors 416 and 426 as described above resulting in reference signal $I_{ref}$ and measurement heterodyne signal $I_{het}$. Signals $I_{ref}$ and $I_{het}$ are routed to slider controller 461 which, in turn, switches the path of the signals to $\delta_{Ref/Sub}$ detector 462 or $\delta_{Ref/film}$ detector 463 depending on the propagation mode; in HR mode the signals $I_{ref}$ and $I_{het}$ are routed to and in SR mode the signals $I_{ref}$ and $I_{het}$ are routed to $\delta_{Ref/Sub}$ detector 462. $\delta_{Ref/film}$ is the phase difference between the signals $I_{ref}$ and $I_{het}$ operating in HR mode. Using Equation (5) below, $\delta_{Ref/film}$ detector 463 detects $\delta_{Ref/film}$ from signals $I_{ref}$ and $I_{het}$.

$$\delta_{Ref/film}=(\phi_{Ref}+\phi_{noise1})-(\phi_{het}+\phi_{Sub}+\phi_{film}+\phi_{noise2}) \quad (5)$$

Where, $\delta_{Ref/film}$ is the phase shift due to the film,
$\phi_{Ref}$ is the phase shift associated with the reference detector from BS 412,
$\phi_{noise1}$ is the phase shift associated with the detector noise,
$\phi_{het}$ is the phase shift associated with the heterodyne measurement detector from BS 412,
$\phi_{noise2}$ is the phase shift associated with the detector noise,
$\phi_{Sub}$ is the phase shift associated with the substrate, and
$\phi_{film}$ is the phase shift associated with the film.

FIG. 4C shows the operational state for the self referencing heterodyne reflectometer in the SR beam generation mode. Here, slider controller 461 instructs slider actuator 470 to move in the SR beam position with polarizer/$\lambda$/2 combination 410/411 directly in the path of beam 402, thereby converting HR beam 402 into a p-polarized SR beam with split optical frequencies of $\omega$ and $\omega+\Delta\omega$ (SR beam 433). Incident SR beam 433 propagates to detectors 416 and 426 as described above resulting in reference signal $I_{ref}$ and measurement heterodyne signal $I_{het}$. Signals $I_{ref}$ and $I_{het}$ are routed to slider controller 461 which now switches the path of the signals to $\delta_{Ref/Sub}$ detector 462. Reference phase $\delta_{Ref/Sub}$ is the phase difference between the signals $I_{ref}$ and $I_{het}$ operating in SR mode. Using Equation (6) below, $\delta_{Ref/Sub}$ detector 462 detects $\delta_{Ref/Sub}$ from signals $I_{ref}$ and $I_{het}$.

$$\delta_{Ref/Sub}=(\phi_{Ref}+\phi_{noise1})-(\phi_{het}+\phi_{Sub}+\phi_{noise2}) \quad (6)$$

Where, $\delta_{Ref/Sub}$ is a reference phase shift due to the substrate,
$\phi_{Ref}$ is the phase shift associated with the reference detector from BS 412,
$\phi_{noise1}$ is the phase shift associated with the detector noise,
$\phi_{het}$ is the phase shift associated with the heterodyne measurement detector from BS 412,
$\phi_{noise2}$ is the phase shift associated with the detector noise, and
$\phi_{Sub}$ is the phase shift associated with the substrate.

Notice that unlike Equation (5), Equation (6) for finding $\delta_{Ref/Sub}$ does not contain any terms that depends of the film phase shift, and therefore, the value of $\delta_{Ref/Sub}$ is unaffected by changes in the film phase (i.e., changes in the thickness of the film).

By alternating between the HR and SR modes in rapid succession, temperature induced noise in the detector can be assumed to be the same as for both measurements and effectively equivalent for reference phase $\delta_{Ref/Sub}$ and the measurement $\delta_{Ref/film}$, i.e., $\phi_{noise1}=\phi_{noise2}$. The phase shift of the film can then be calculated using Equation (7) below. In so doing, the temperature induced detector noise on both detectors is effectively canceled out, yielding a temperature independent $\Delta\phi_{film}$.

$$2\Delta\phi_{film}=\delta_{Ref/Sub}-\delta_{Ref/film} \quad (7)$$

Where, $\Delta\phi_{film}$ is the phase shift due to the film layer.
Using Equation (7), the phase shift due to the film layer, $\Delta\phi_{film}$, is calculated by $\Delta\phi_{film}$ calculator 466 subsequent to each $\delta_{Ref/Sub}$ and $\delta_{Ref/film}$ measurement. Assuming the noise levels between successive measurements are the same (or sufficiently small), the thickness, $d_f$, of film 214 can then be determined directly by $d_f$ calculator 468 using Equation (4) above, with the refractive index for the particular film, $n_f$, the wavelength, $\lambda$, of light source 400, and the angle of incidence, $\alpha$.

The level of detector noise may be monitored by comparing successive $\delta_{Ref/Sub}$ measurements for changes. Recall that $\delta_{Ref/Sub}$ is calculated from a self referencing beam that is unaffected by changes in film thickness, hence $\delta_{Ref/Sub}$ is also unaffected by changes in film thickness. From Equation (6) above, it is apparent that the value of $\delta_{Ref/Sub}$ will not change between successive $\delta_{Ref/Sub}$ measurements unless the level of detector noise changes. Therefore, the severity of the detector noise can be determined by comparing the change in successive $\delta_{Ref/Sub}$ measurements to a noise threshold.

Therefore, in accordance with another aspect of the present invention, detector noise is monitored and when the noise level is unacceptable, the $\Delta\phi_{film}$ is averaged over several measurement cycles. Returning to FIGS. 4A-4C, threshold noise detector 465 monitors successive $\delta_{Ref/Sub}$ measurements from $\delta_{Ref/Sub}$ detector 462 and compares changes in the noise level to a threshold. If the level is below the threshold level, threshold noise detector 465 takes no action, but if the noise level is found to be higher than the acceptable noise threshold, $\delta_{Ref/Sub}$ detector 462 instructs $\Delta\phi_{film}$ averager 467 to average several or more cycles of $\Delta\phi_{film}$ data from $\Delta\phi_{film}$ calculator 466, and output an averaged $\Delta\phi_{film(AVG)}$ to $d_f$ calculator 468.

FIG. 5 is a flowchart depicting the method for finding a temperature independent film thickness using a self-referencing heterodyne reflectometry in accordance with an exemplary embodiment of the present invention. The process begins by propagating HR beam with s-polarization at frequency $\omega$ and p-polarization at frequency $\omega+\Delta\omega$ to a target sample at $\alpha$ angle of incidence (step 502). The reflected HR beam is detected at a reference detector and a heterodyne measurement detector (step 504) and $\delta_{Ref/film}$ determined from $I_{ref}$ and $I_{het}$ signals from the respective detectors (step 506). The self-referencing mode processing is similar. An SR beam with p-polarization at frequency $\omega$ and p-polarization at frequency $\omega+\Delta\omega$ is propagated to a target sample at $\alpha$ angle of incidence (step 508). The reflected SR beam is detected at a reference detector and a heterodyne measurement detector (step 510) and $\delta_{Ref/Sub}$ determined from $I_{ref}$ and $I_{het}$ signals from the respective detectors (step 512). Next, temperature independent the phase shift, $\Delta\phi_{film}$, attributable to the film is calculated from difference of $\delta_{Ref/Sub}$ and $\delta_{Ref/film}$ (step 514). Finally, the film thickness, $d_f$, can be calculated from $\Delta\phi$, $n_f$, $\alpha$ and $\lambda$ using, for example, Equation (4) (step 516). The refractive index, $n_f$, for the particular film should be known beforehand. Alternatively, the measurement detector of the self-referencing heterodyne reflectometer can be augmented with a grating interferometer as disclosed in U.S. patent application Ser. Nos. 11/066,933 and 11/178,856, from which the refractive index, $n_f$, for the film and be dynamically measured.

Figure 6A:
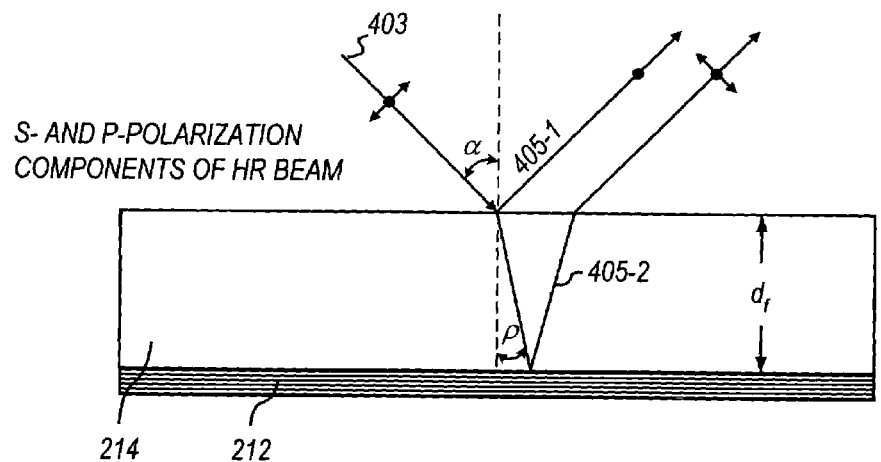
FIGS. 6A and 6B diagrammatically illustrate the interactions between the HR beam and/or SR beam with the film and substrate.
Figure 6B:
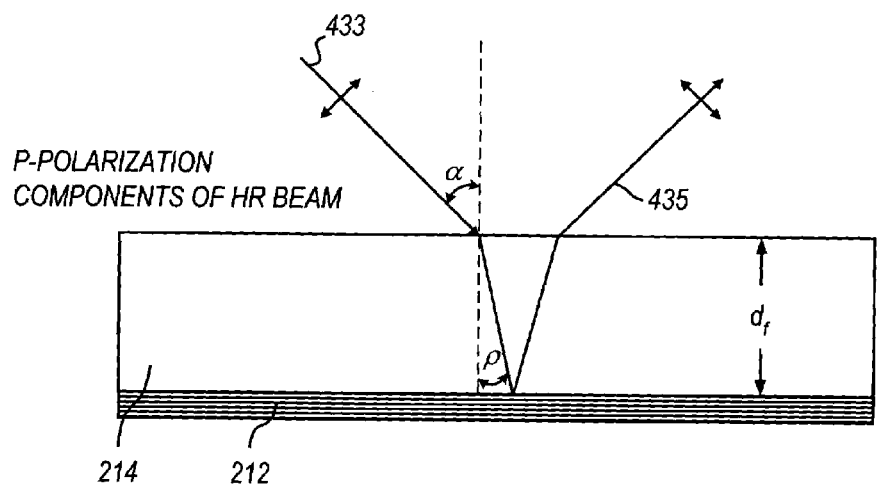

FIGS. 6A and 6B diagrammatically illustrate the interactions between the HR beam and/or SR beam with the film and substrate. FIG. 6A shows the HR beam interactions and FIG. 6B depicts the SR beam interactions. FIG. 6A is essentially a composite of FIGS. 3A and 3B discussed above, and shows incident HR beam 403 comprised of two linearly polarized s- and p-polarized beam components that are orthogonal to each other, with split optical frequencies of $\omega$ and $\omega+\Delta\omega$. The s-polarization component interacts with the surface of film 214 and is partially reflected as ray 405-1. Ray 405-1 is almost completely s-polarization. Incident angle $\alpha$ is at the Brewster of film 214 for optimizing the reflected s-polarization component of ray 405-1. On the other hand, the p-polarization component does not interact with the surface of film 214 and refracts from the interface between film 214 and substrate 212 at angle ρ as ray 405-2. However, because some of the s-polarization component is also refracted, ray 405-2 comprises both s- and p-polarization components. Clearly, as the thickness of film 214 changes, the distance traversed by the HR beam (beam 403 and ray ) will change and consequently the phase will also experience a corresponding change at the detector.

FIG. 6B shows incident SR beam 433 comprised of two linearly polarized p- and p-polarized beam components, with split optical frequencies of ω and ω+Δω. With incident angle α approximating the Brewster of film 214, only a minimal reflection of the p-polarized SR beam occurs at the surface of film 214. Instead, incident SR beam 433 refracts into film 214 and reflects off the interface between film 214 and substrate 212 at angle ρ as ray 435. Unlike the HR beam, the SR beam is unaffected by changes in the thickness of film 214 because the beam does not interact with the surface of the film. The beat signals generated by the SR beams can be used to obtain a reference phase value, which is equivalent to that obtained using a reference sample. This reduces the need to have periodic access to reference wafer. The availability of a reference phase, which is unaffected by changes in film thickness, but drifts with temperature a corresponding amount as the measured film phase, allows for real-time phase drift corrections to the measured film phase.

In addition to compensating for temperature related phase drift and eliminating the necessity for calibration wafers, the availability of a reference phase also provides a mechanism for assessing detector noise. As mentioned above, temperature induced phase drift (or noise) from the detector can be assumed to be the same as for successive measurements and therefore can be canceled out. However, it is possible for the level of spurious noise in the detector to reach a level where this may not hold true. In that case, merely canceling the noise may provide an inferior result. In accordance with another exemplary embodiment of the present invention the level of detector noise can be monitored in real-time, thereby providing a basis for implementing more rigorous noise reduction measures.

FIG. 7 is a flowchart depicting the method for identifying detector noise that may be resistive to the noise canceling in accordance with an exemplary embodiment of the present invention. The process begins by finding successive values of $\delta_{Ref/Sub}$ from successive SR beam measurements, i.e., $\delta_{Ref/Sub1}$ and $\delta_{Ref/Sub2}$ (step 702). Recall that reference phase $\delta_{Ref/Sub}$ is unaffected by changes in film thickness, but is affected by detector noise and drift with temperature. Phase drift, and other noise affecting the phase, is assumed to be negligible between successive measurements made in rapid succession. However, some noise may exist. If $\delta_{Ref/Sub1} - \delta_{Ref/Sub2} = 0$, the detector noise and/or drift are negligible. However, where the phase difference between successive measurements is greater than 0, i.e., $\delta_{Ref/Sub1} - \delta_{Ref/Sub2} > 0$, some noise is present and, depending on the amount, should be suppressed. A noise threshold level can be adopted for a particular application, below which the results are acceptable and additional suppression is not necessary. Therefore, threshold noise detector 465 compares the phase difference between successive reference phase measurements to a noise threshold, i.e., $|\delta_{Ref/Sub1} - \delta_{Ref/Sub2}| >$ THRESHOLD (step 704). If the noise increment is below the threshold level, $d_f$ calculations proceed by finding the film induced phase shift, $\Delta\phi_{film}$, from the measurement phase $\delta_{Ref/film}$ and the reference $\delta_{Ref/Sub}$ (step 706) and then the film thickness $d_f$ from $\Delta\phi_{film}$, $n_f$, α and λ (step 710). If, at step 704, $|\delta_{Ref/Sub1} - \delta_{Ref/Sub2}|$ is greater than the noise threshold, additional noise suppression procedures should be implemented. One exemplary procedure is to smooth the noise profile by averaging the result over several successive measurement cycles (step 708). Any of $\Delta\phi_{film}$, $\delta_{Ref/Sub}$ and $\delta_{Ref/film}$ or $d_f$ can be averaged, but averaging $\Delta\phi_{film}$ or $\delta_{Ref/Sub}$ and $\delta_{Ref/film}$ can be accomplished in earlier stages of the process. In any case, film thickness $d_f$ from $\Delta\phi_{film}$, $n_f$, α and λ, albeit and averaged thickness (step 710).

Figure 8A:
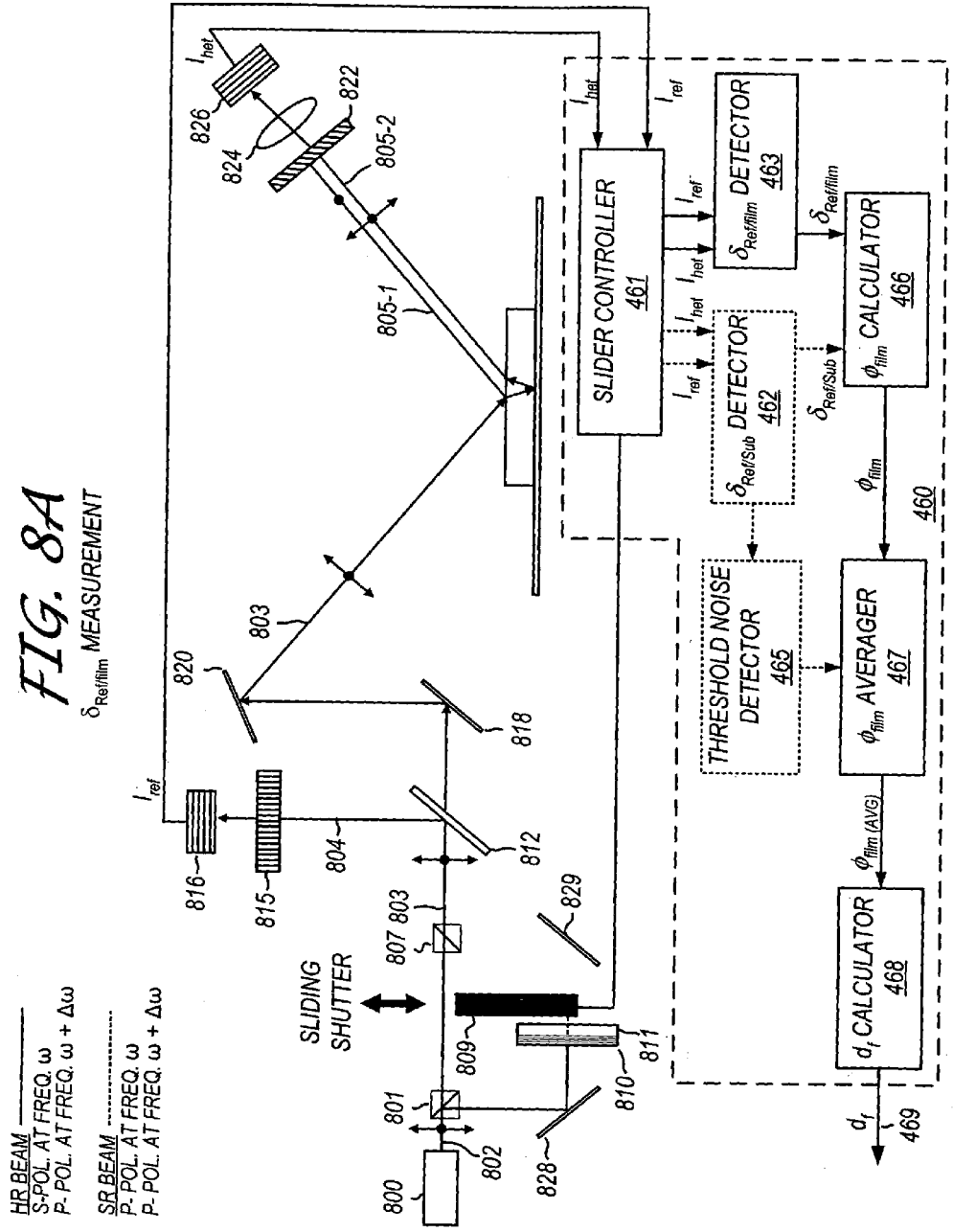

The present invention, as depicted in FIGS. 4A-4C, rapidly alternates between HR mode and SR modes for detecting $\delta_{Ref/film}$ phase measurement and $\delta_{Ref/Sub}$ reference phase by sliding polarizer/λ/2—aperture component in the path of the HR beam. FIGS. 8A and 8B are diagrams of a self referencing heterodyne reflectometer configured without moving optical components in accordance with an exemplary embodiment of the present invention. FIG. 8A shows the self referencing heterodyne reflectometer in HR mode for detecting a $\delta_{Ref/film}$ phase measurement and FIG. 8B depicts the reflectometer in SR mode for detecting $\delta_{Ref/Sub}$ reference phase. Much of the structure is similar to that discussed above with regard to FIGS. 4A-4C, and therefore only the distinctions will be discussed in greater specificity.

In accordance with this exemplary embodiment, HR beam 802 is selectively propagated in an HR path and an SR path. Sliding shutter 809 selectively opens one path, while simultaneously closing the other. Slider controller 461 provides the operational control signals for repositioning sliding shutter 809. In the HR mode the HR path is open with sliding shutter 809 blocking the SR path. HR beam 803 reflects off BS 812 as beam 804 to detector 416, resulting in reference signal $I_{ref}$. Incident HR beam 803, the portion of HR beam 802 transmitted through BS 812, interacts with film 214, and on to detector 826 as rays 805-1 and 805-2. Slider controller 461 receives signals $I_{ref}$ and $I_{het}$ as described above, which are passed to $\delta_{Ref/film}$ detector 463 for detection of $\delta_{Ref/film}$ measurement phase.

In the SR mode, sliding shutter 809 blocks the HR path and opens the SR path. HR beam 802 from light source 800, is deflected at BS 801 and reflected at optical component 828 to stationary polarizer/λ/2 combination 810/811 where SR beam 833 is formed. Recall that HR beam is a split frequency, linearly polarized where one polarization component at frequency ω is orthogonal with respect to the other polarization component at frequency ω+Δω. The SR beam is a split frequency, p-polarized beam. Incident SR beam 833 converges back to the path of the incident HR beam 803 at BS 807. SR beam 833 reflects off BS 812 as beam 834 to detector 416, resulting in reference signal $I_{ref}$. The portion of SR beam 833 transmitted through BS 812, interacts with film 214, and on to detector 826 as ray 835. Slider controller 461 receives signals $I_{ref}$ and $I_{het}$ as described above, which are passed to $\delta_{Ref/Sub}$ detector 462 for detection of $\delta_{Ref/Sub}$ measurement phase.

In this exemplary embodiment a significant amount of light is lost and hence light source 800 should be selected to accommodate the loss of light. As a sidebar, the combination of BS 811 and 807 with reflection components 828 and 829 suggest the look of a Mach Zehnder interferometer, but because self referencing beam 833 and the HR beam 803 are not used simultaneously, there is no optical interference between them and hence no finite fringe issue. Also, the different paths traveled by the beams before reaching BS 812 will have no effect on phase measurement since the phase differencing, between $I_{Ref}$ and $I_{het}$ signals, for each beam is accomplished after BS 812.

The $\delta_{Ref/Sub}$ reference phase provides a reference from which accurate temperature independent film phase shifts, $\Delta\phi_{film}$, may be derived without the use of a reference wafer. It can be assumed that $\phi_{Sub1} \approx \phi_{Sub2} \approx \phi_{Subn}$ across a wafer, and therefore the HR and SR beam spots on a film need not be coextensive. Thus, the self referencing heterodyne reflectometer depicted in FIGS. 8A and 8B can be made significantly less lossy by separating the SR beam and HR beam paths.

Figure 9A:
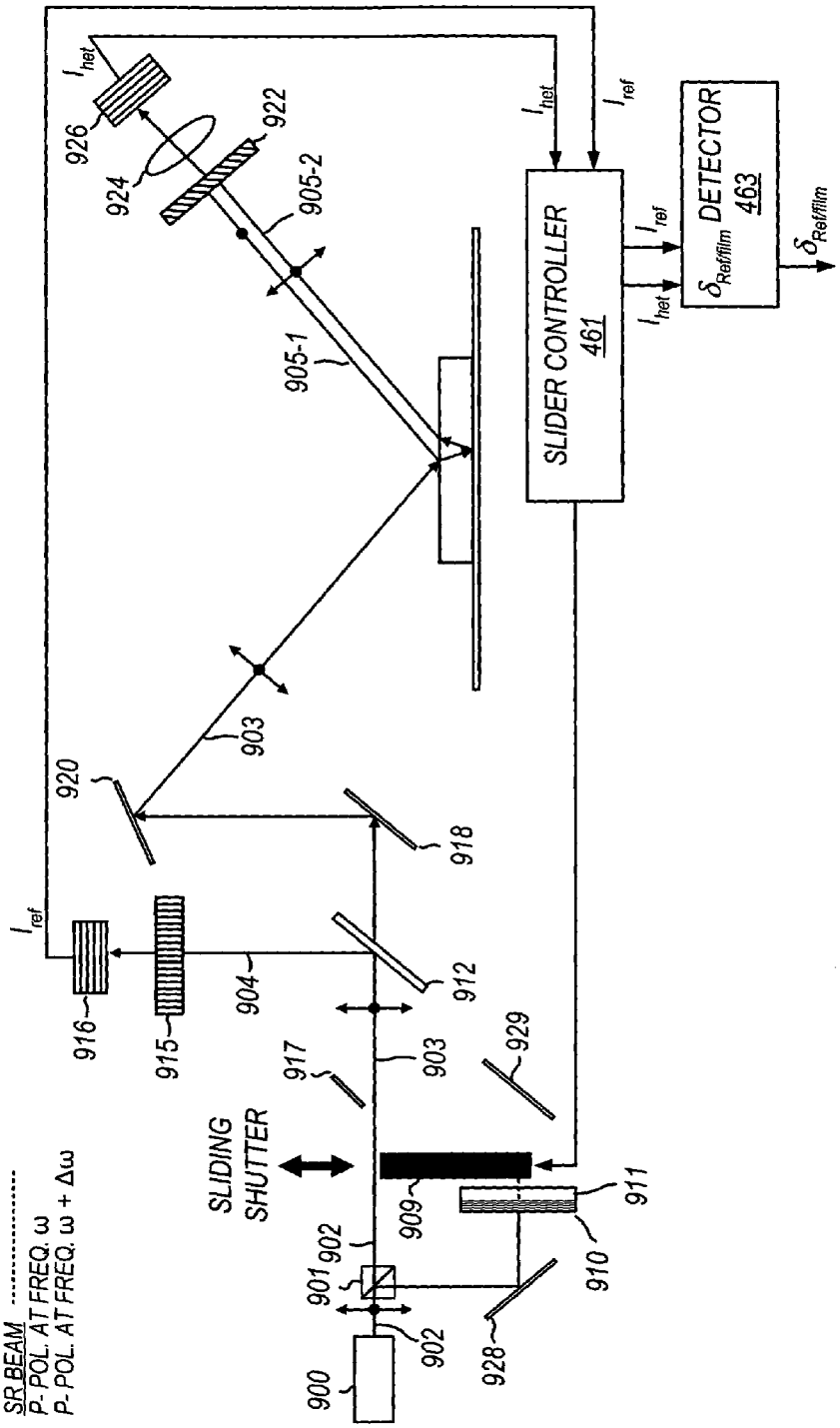
FIGS. 9A and 9B are diagrams of a self referencing heterodyne reflectometer with separate SR beam and HR beam paths in accordance with an exemplary embodiment of the present invention.
Figure 9B:
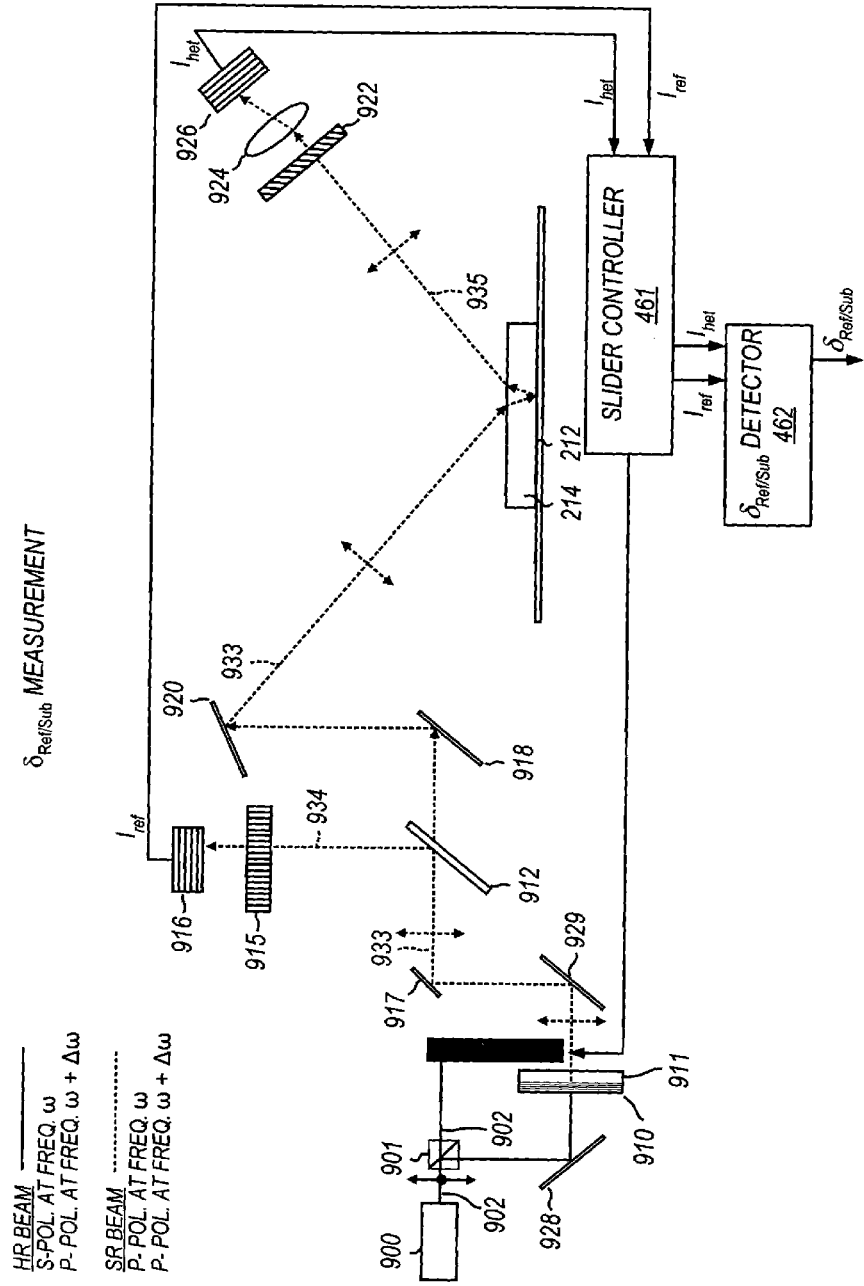

FIGS. 9A and 9B are diagrams of a self referencing heterodyne reflectometer with separate SR beam and HR beam paths in accordance with an exemplary embodiment of the present invention. The self referencing heterodyne reflectometer shown in FIGS. 9A and 9B is identical to that depicted in FIGS. 8A and 8B with the exception of the paths of the incident and reflected SR beams. Rather than utilizing a pair of beam splitters for diverging and collimating the separate beam paths, SR beam 933 propagates in an essentially parallel path to that of HR beam 903 via reflection optics 917 which is out of line with BS 901. HR beam 902 is deflected at BS 901 into the SR path to stationary polarizer/λ/2 combination 910/911 where SR beam 933 is formed, and on to reflection optics 917.

Figure 10A:
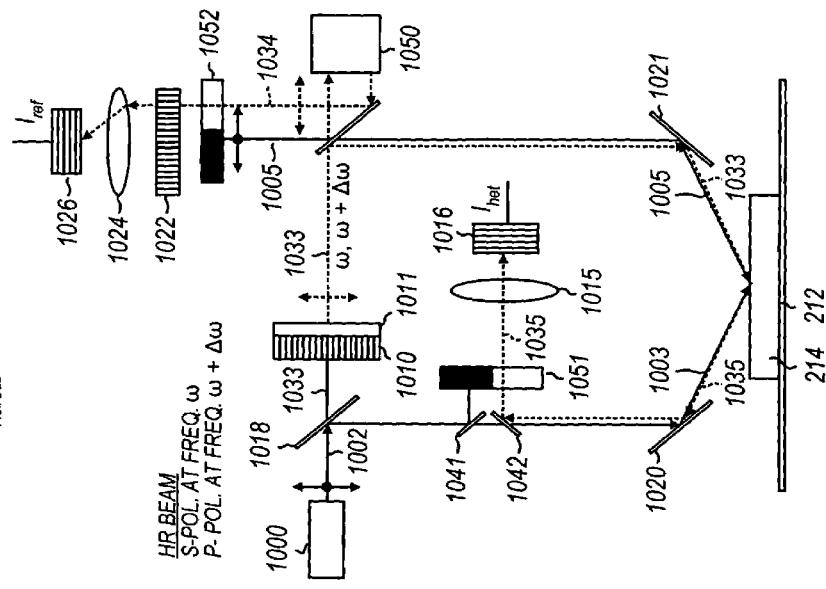
FIGS. 10A and 10B are diagrams of a self referencing heterodyne reflectometer with counter rotating SR and HR beam paths in accordance with an exemplary embodiment of the present invention.
Figure 10B:
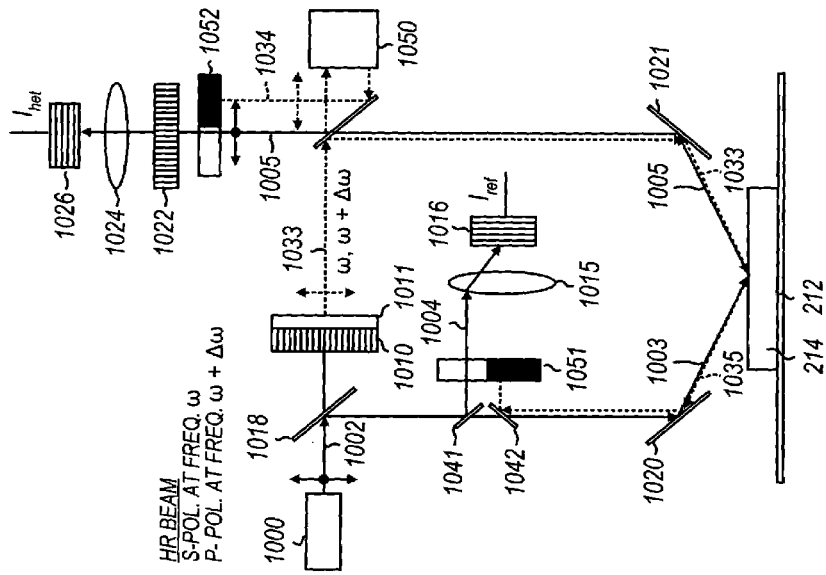

FIGS. 10A and 10B are diagrams of a self referencing heterodyne reflectometer with counter rotating SR and HR beam paths in accordance with an exemplary embodiment of the present invention. Two synchronous shutters are necessary for switching modes, one at either detector. As should be appreciated, because the HR and SR beams propagate in directions counter to each other, detector 1016 detects signal $I_{ref}$ for HR beam 1004 and $I_{het}$ for SR beam 1035. Conversely, detector 1026 detects signal $I_{ref}$ for SR beam 1034 and $I_{het}$ for HR beam 1005. In HR mode, HR beam 1102 beam is reflected at BS 1018 as incident HR beam 1003 and off BS 1041, passed open shutter 1051 to detector 1016. At BS 1041, the transmitted portion of beam 1003 propagates in a counter clockwise direction (with respect to FIGS. 10A and 10B) off optical reflector 1020 to film 214 and reflected HR beam 1005 continues off optical reflector 1021, through BS 1023 and passed open shutter 1052 to detector 1026. In SR mode, HR beam 1102 beam is transmitted through BS 1018 to polarizer/ λ/2 1010/1011 and converted to p-polarized, split frequency SR beam 1033. At BS 1023 the transmitted portion of SR beam 1033 is turned at corner cube 1050 to BS 1023 and passed open shutter 1052 to detector 1026. At BS 1023 the reflected portion of SR beam 1033 propagates in a direction counter to HR beam 1003 off optical reflector 1021 to film 214 and reflected SR beam 1035 continues off optical reflector 1020, reflecting off through BS 1042 and passed open shutter 1051 to detector 1016.

Figure 11A:
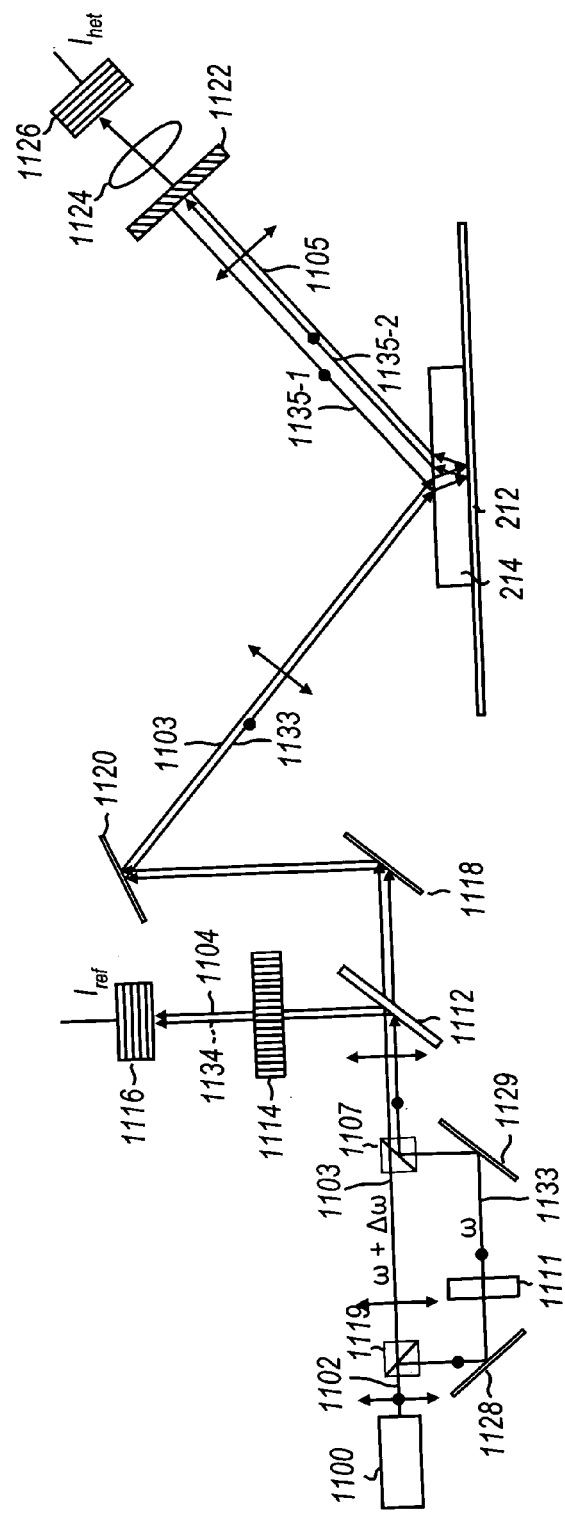
FIGS. 11A and 11B are diagrams of a self referencing heterodyne reflectometer employing a liquid crystal variable retarder (LCVR) for electronically switching between HR and SR operating modes in accordance with an exemplary embodiment of the present invention.
Figure 11B:
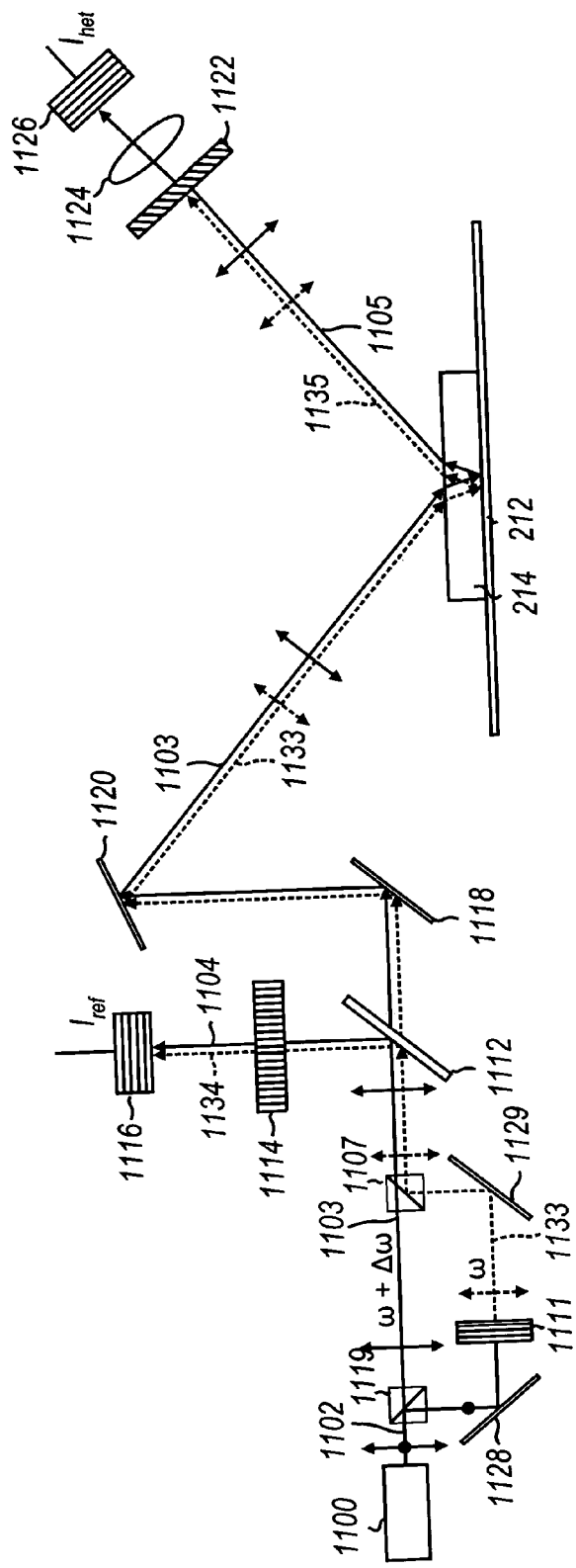

FIGS. 11A and 11B are diagrams of a self referencing heterodyne reflectometer employing a liquid crystal variable retarder (LCVR) for electronically switching between HR and SR operating modes in accordance with an exemplary embodiment of the present invention. The configuration of self referencing heterodyne reflectometer shown in FIGS. 11A and 11B is similar to that depicted in FIGS. 8A and 8B with the exception of polarizing BS 1119 in the HR beam path and LCVR 1111 in the SR beam path but operationally is quite different. LCVR 1111 is a device, which causes the polarization of a light beam to be rotated by an angle, which is dependent upon the voltage applied to it. When the retarder is set so that the polarization is not rotated, the device operates as a heterodyne interferometer as previously described. When the retarder is set to rotate the polarization by 90°, then the beams at both frequencies are p-polarized, and the SR function is obtained. In this embodiment, the amount of light lost is reduced. On the other hand, the path between PBS 1119 and BS 1107 acts as a Mach Zehnder interferometer.

In the HR mode, HR beam 1102 is separated into p- and s-polarization components at polarizing beam splitter PBS 1119, the p-polarization component (at frequency $\omega+\Delta\omega$) propagates as beam 1103 and the s-polarization component (at frequency $\omega$) propagates as beam 1133. Beam 1103 reflects off BS 1112 as beam 1104 to detector 1116. Incident HR beam 1103, the portion of HR beam 1102 transmitted through BS 1112, interacts with film 214, and on to detector 1126 as rays 1105. The s-polarization component of HR beam 1102 passes through LCVR 1111, which is switched OFF in HR mode, as beam 1133. Beam 1133 reflects off BS 1107 and also reflects off BS 1112 as beam 1134 to detector 1116. HR beams 1134 and 1104 result in reference signal $I_{ref}$. The portion of beam 1133 transmitted through BS 1112 interacts with film 214, and on to detector 1126 as rays 1135-1 and 1135-2. Taken together, beams 1103 and 1133 are HR. Reflected HR beam components 1105, 1135-1 and 1135-2 result in heterodyne measurement signal $I_{het}$.

In the SR mode, HR beam 1102 is separated into p- and s-polarization components at polarizing beam splitter PBS 1119, with the p-polarization component (at frequency $\omega+\Delta\omega$) propagating as beam 1103 as described above. The s-polarization component of HR beam 1102 is transformed into p-polarized beam 1133 by LCVR 1111, which is ON in SR mode. Beam 1133 reflects off BS 1107 and again off BS 1112 as beam 1134 to detector 1116. Beams 1134 and 1104 result in reference signal $I_{ref}$ for the SR mode. The portion of beam 1133 transmitted through BS 1112 interacts with film 214, and on to detector 1126 as ray 1135. Reflected SR beam components 1105 and 1135 result in heterodyne measurement signal $I_{het}$.

Figure 12A:
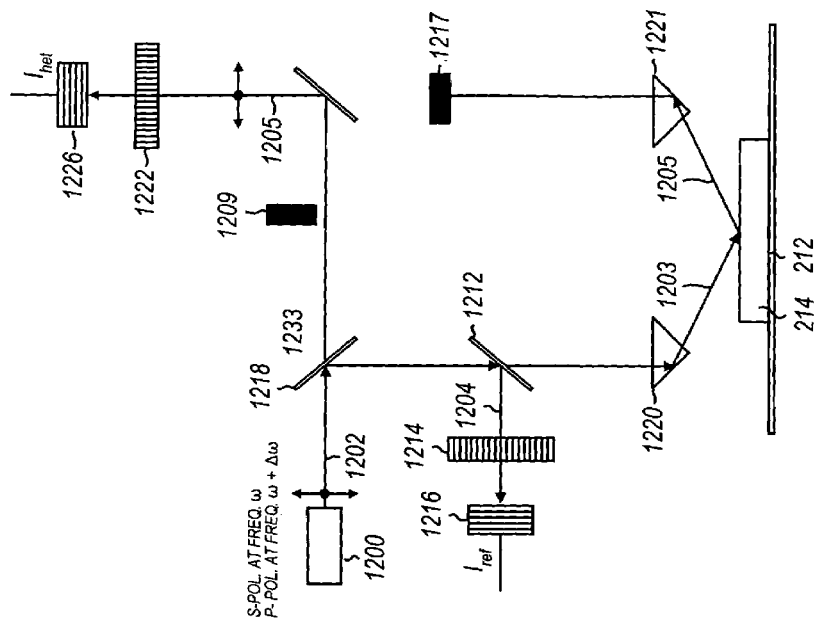
FIGS. 12A and 12B are diagrams of a self referencing heterodyne reflectometer in which the SR beam bypasses the sample for addressing the sole issue of detector phase drift in accordance with an exemplary embodiment of the present invention.
Figure 12B:
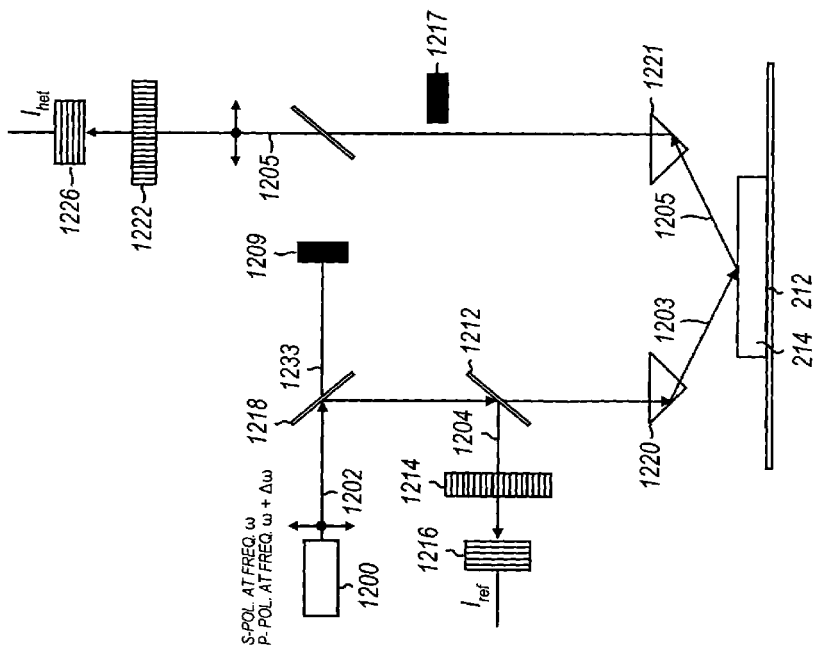

FIGS. 12A and 12B are diagrams of a self referencing heterodyne reflectometer in which the SR beam bypasses the sample for addressing the sole issue of detector phase drift in accordance with an exemplary embodiment of the present invention. To remove the effects of phase drift from the system, the split frequency light is measured in an alternating fashion by the detector 1226. In the wafer measurement mode (the HR Mode), In the HR mode, HR beam 1202 is reflected as HR beam 1103 by beam splitter BS 1218. Beam 1203 reflects off BS 1212 as beam 1204 to detector 1216, resulting in reference signal $I_{ref}$ for the HR mode. Incident HR beam 1203 interacts with film 214, passing open shutter 1217 and on to detector 1226 as rays 1205 (actually 1205-1 and 1205-2), resulting in heterodyne measurement signal $I_{het}$ for the HR mode. The potion of beam 1202 transmitted through BS 1218 is blocked by shutter 1209. In wafer measurement mode (SR mode) shutters 1209 and 1217 reverse their positions with shutter 1217 blocking reflected HR beam components 1205, and shutter 1209 in the open position. Beam 1205 transmitted through BS 1218 is measured at detector 1226, while reflected beam 1204 is measured at detector 1216. This measurement allows the ability to determine the phase offset between each detector just prior to or after each measurement of the wafer.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for measuring a thickness parameter comprising:
   measuring a heterodyne phase shift, comprising:
   receiving a split frequency, dual polarized beam;
   detecting a reference signal from the split frequency, dual polarized beam;
   propagating the split frequency, dual polarized beam to a target;
   receiving a reflected split frequency, dual polarized beam from the target;
   detecting a measurement signal from the reflected split frequency, dual polarized beam; and
   measuring a phase difference between the reference signal and the measurement signal for the reflected split frequency, dual polarized beam;
   measuring a self referencing phase shift, comprising:
   receiving a split frequency, p-polarized beam;
   detecting a reference signal from the split frequency, p-polarized beam;
   propagating the split frequency, p-polarized beam to a target;
   receiving a reflected split frequency, p-polarized beam from the target;
   detecting a second measurement signal from the reflected split frequency, p-polarized beam; and
   measuring a self referencing phase difference between the reference signal and the measurement signal for the split frequency, p-polarized beam;
   calibrating the phase difference for the target with the self referencing phase difference; and
   finding a thickness parameter from the phase difference for the target.

2. A method for measuring a thickness parameter comprising:
   operating in heterodyne ref lectometry mode, comprising;
   generating a ref lectometry beam;
   propagating the ref lectometry beam incident to a target material at a predetermined angle of incidence;
   measuring a ref lectometry beam heterodyne phase for the ref lectometry beam from the target;
   finding a ref lectometry beam heterodyne phase shift from the reflectometry beam heterodyne phase, wherein the ref lectometry beam heterodyne phase shift is induced by the ref lectometry beam interacting with the target material;
   operating in self referencing mode, comprising:
   generating a self referencing beam;
   propagating the self referencing beam incident to the target material at the predetermined angle of incidence;
   measuring a self referencing beam heterodyne phase for the self referencing beam from the target material; and
   finding a self referencing beam heterodyne phase shift from the self referencing beam heterodyne phase, wherein the self referencing beam heterodyne phase shift is induced by the self referencing beam interacting with the target material; and
   finding a thickness parameter from the reflectometry beam heterodyne phase shift and the self referencing beam heterodyne phase shift.

3. The method recited in claim 2, wherein operating in heterodyne ref lectometry mode further comprises:
   measuring a reflectometry beam reference phase for the reflectometry beam and, wherein finding the reflectometry beam heterodyne phase shift from the reflectometry beam heterodyne phase further comprises, finding a phase shift between the ref lectometry beam heterodyne phase and the ref lectometry beam reference phase.

4. The method recited in claim 3, wherein operating in self referencing mode further comprises:
   measuring a self referencing beam reference phase for the self referencing beam and finding the self referencing beam heterodyne phase shift from the self referencing beam heterodyne phase further comprises, finding a phase shift phase between the self referencing beam heterodyne phase and the self referencing beam reference phase.

5. The method recited in claim 4, wherein the predetermined angle of incidence is based on a Brewster angle for the target material.

6. The method recited in claim 5, wherein generating a reflectometry beam further comprises:
   generating a split frequency, dual polarized beam.

7. The method recited in claim 6, wherein generating a self referencing beam further comprises:
   generating a split frequency, polarized beam.

8. The method recited in claim 6, wherein the split frequency, polarized beam further comprises:
   an s-polarized beam component at a first frequency; and
   a p-polarized beam component at a second frequency.

9. The method recited in claim 7, wherein the split frequency, dual polarized beam further comprises:
   a p-polarized beam component at the first frequency; and
   a p-polarized beam component at the second frequency.

10. The method recited in claim 9, wherein finding a thickness parameter from the reflectometry beam heterodyne phase shift and the self referencing beam heterodyne phase shift further comprises:
    finding a thickness of the target material from the ref lectometry beam heterodyne phase shift and the self referencing beam heterodyne phase shift, one of the first and second frequencies and a refractive induced by the target material.

11. The method recited in claim 10, wherein generating a self referencing beam further comprises:
    phase shifting the s-polarized beam at the first frequency to a p-polarized beam at the first frequency.

12. The method recited in claim 11, further comprise:
    iterating between heterodyne ref lectometry mode and self referencing mode; and
    finding a thickness of the target material at each iteration.

13. A self referencing heterodyne reflectometer, comprising:
    a heterodyne ref lectometry beam source;
    a operating mode switcher for receiving the heterodyne reflectometry beam and converting the heterodyne ref lectometry beam to a self referencing beam;
    a reference detector for receiving the heterodyne reflectometry beam and generating a reference heterodyne reflectometry phase signal, and for receiving the self referencing beam and generating a reference self referencing phase signal;
    a target material;
    first optical elements for propagating the heterodyne reflectometry beam and the self referencing beam incident to the target material at a predetermined angle of incidence;
    a measurement detector for receiving the heterodyne reflectometry beam from the target material and generating a measurement heterodyne reflectometry phase signal, and for receiving the self referencing beam from the target material and generating a measurement self referencing phase signal;
    a heterodyne phase shift detector for detecting a heterodyne phase shift between the reference heterodyne reflectometry phase signal and the measurement heterodyne reflectometry phase signal; and a self referencing phase shift detector for detecting a reference phase shift between the reference self referencing phase signal and the measurement self referencing phase signal.

14. The self referencing heterodyne reflectometer recited in claim 13, further comprising:

a phase shift calculator for receiving the measurement phase shift and the reference phase shift and calculating a phase shift induced by the target.

15. The self referencing heterodyne reflectometer recited in claim 13, wherein the heterodyne reflectometry beam source generates an s-polarized beam component at the first frequency and a p-polarized beam component at the second frequency.

16. The self referencing heterodyne reflectometer recited in claim 15, wherein the operational mode switcher converts the s-polarized beam component at the first frequency to a p-polarization component at a first frequency.

17. The self referencing heterodyne reflectometer recited in claim 15, wherein the operational mode switcher further comprises:

a polarizer;

a half-wave plate; and a mechanical slider for sliding the polarizer and the half-wave plate in a path of the heterodyne reflectometry beam.

18. The self referencing heterodyne reflectometer recited in claim 17, further comprises:

a slider controller for iterating between heterodyne reflectometry mode and self referencing mode, said slider controller being operationally coupled to the operating mode switcher, the heterodyne phase shift detector and the self referencing phase shift detector, wherein in self referencing mode the comptroller instructs the operating mode switcher to slide the mechanical slider in a path of the heterodyne reflectometry beam and instructs the self referencing phase shift detector to detect a phase shift, and wherein in heterodyne reflectometry mode the comptroller instructs the operating mode switcher to slide the mechanical slider out of the path of the heterodyne reflectometry beam and instructs the heterodyne phase shift detector to detect a phase shift.

19. The self referencing heterodyne reflectometer recited in claim 18, further comprises:

a thickness calculator for receiving phase shifts from a phase shift calculator and calculating a thickness for the target material.

20. The self referencing heterodyne reflectometer recited in claim 19, wherein the a heterodyne reflectometry beam source further comprises:

a He—Ne laser.

21. The self referencing heterodyne reflectometer recited in claim 19, wherein the predetermined angle of incidence is based on a Brewster angle for the target material.

22. A method for measuring a thickness parameter comprising:

iterating a beam between a heterodyne reflectometry operating mode and a self referencing operating mode, said heterodyne reflectometry operating mode including generating an s-polarized beam component at the first frequency and a p-polarized beam component at the second frequency and said self referencing operating mode including generating a p-polarized beam component at the first frequency and a p-polarized beam component at the second frequency;

receiving the beam at a reference detector and generating a reference beam phase signal;

propagating the reflectometry beam incident to a target material at a predetermined angle of incidence;

receiving the beam at a measurement detector from the target material and generating a measurement beam phase signal;

at each iteration, finding a reflectometry beam heterodyne phase shift from the measurement beam phase signal and the reference beam phase signal and finding a thickness parameter for the target material from the reflectometry beam heterodyne phase shift.

* * * * *